United States Patent
Yerkes et al.

(10) Patent No.: US 11,443,453 B2
(45) Date of Patent: Sep. 13, 2022

(54) METHOD AND DEVICE FOR DETECTING PLANES AND/OR QUADTREES FOR USE AS A VIRTUAL SUBSTRATE

(71) Applicant: Apple Inc., Cupertino, CA (US)

(72) Inventors: Giancarlo Yerkes, Menlo Park, CA (US); Aitor Aldoma Buchaca, Los Gatos, CA (US); Na Wong, San Jose, CA (US); Oliver Montague Dunkley, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 177 days.

(21) Appl. No.: 16/983,722

(22) Filed: Aug. 3, 2020

(65) Prior Publication Data
US 2020/0364897 A1 Nov. 19, 2020

Related U.S. Application Data

(63) Continuation of application No. 15/978,130, filed on May 12, 2018, now Pat. No. 10,796,445.

(60) Provisional application No. 62/514,529, filed on Jun. 2, 2017.

(51) Int. Cl.
| | |
|---|---|
| *G06T 7/73* | (2017.01) |
| *G06T 19/00* | (2011.01) |
| *G06T 19/20* | (2011.01) |
| *G06F 3/04845* | (2022.01) |
| *G06T 11/40* | (2006.01) |

(52) U.S. Cl.
CPC ............ *G06T 7/73* (2017.01); *G06F 3/04845* (2013.01); *G06T 11/40* (2013.01); *G06T 19/006* (2013.01); *G06T 19/20* (2013.01); *G06T 2200/24* (2013.01); *G06T 2207/10028* (2013.01); *G06T 2219/2016* (2013.01)

(58) Field of Classification Search
CPC ....... G06T 7/0004; G06T 7/521; G06T 15/20; G06T 7/73; G06T 17/00; G06T 19/006; G06Q 20/10; G06Q 20/04
See application file for complete search history.

(56) References Cited

U.S. PATENT DOCUMENTS

| | | |
|---|---|---|
| 3,246,382 A | 4/1966 | Zierden |
| 5,644,324 A | 7/1997 | Maguire, Jr. |
| 6,682,097 B2 | 1/2004 | Krauss et al. |
| 7,315,331 B2 | 1/2008 | Franzen |
| 7,627,174 B1 | 12/2009 | Adams et al. |
| 7,755,667 B2 | 7/2010 | Rabbani et al. |
| 7,855,737 B2 | 12/2010 | Petrescu et al. |

(Continued)

OTHER PUBLICATIONS

Jean-Emmanuel Deschaud et al., "A Fast and Accurate Plane Detection Algorithm for Large Noisy Point Clouds Using Filtered Normals and Voxel Growing", #DPVT, May 2010, Paris, France.
David Eberly, "Least Squares Fitting of Data", Geometric Tools, LLC, Nov. 20, 2016, pp. 1-12.

(Continued)

*Primary Examiner* — Yosef Kassa
(74) *Attorney, Agent, or Firm* — Fernando & Partners, LLP

(57) ABSTRACT

An electronic device: obtains a plurality of sets of images; synthesizes a three-dimensional point cloud for each of the plurality of sets of images; constructs planes using the respective three-dimensional point clouds; and generates a merged set of quadtrees characterizing a merged set of planes across the three-dimensional point clouds.

22 Claims, 31 Drawing Sheets

(56) References Cited

U.S. PATENT DOCUMENTS

| | | | |
|---|---|---|---|
| 8,072,450 B2 * | 12/2011 | Chang | G06T 7/0004 |
| | | | 702/155 |
| 8,113,829 B2 * | 2/2012 | Sachdeva | A61C 9/0046 |
| | | | 433/24 |
| 8,134,603 B2 | 3/2012 | Auberger et al. | |
| 8,264,499 B1 | 9/2012 | Landry et al. | |
| 8,553,037 B2 | 10/2013 | Smith et al. | |
| 8,884,962 B2 * | 11/2014 | Kmiecik | G01C 11/02 |
| | | | 345/582 |
| 9,047,706 B1 * | 6/2015 | Ogale | G06T 15/20 |
| 9,279,983 B1 | 3/2016 | Davis | |
| 9,324,190 B2 * | 4/2016 | Bell | G06T 19/20 |
| 9,600,936 B2 * | 3/2017 | Boivin | G06T 15/20 |
| 9,652,721 B2 * | 5/2017 | Outwater | H04W 12/06 |

OTHER PUBLICATIONS

Chien-Ming Huang et al., "Plane Fitting Methods of Lidar Point Cloud", Department of Geomatics, National Cheng Kung University, Taiwan, 2008, pp. 1-6.

Renato F. Salas-Moreno et al., "Dense Planar SLAM", Imperial College London, Mar. 2014, pp. 1-8.

Arloopa, Augmented/Virtual Reality: Markerless Tracking For Floor, Wall, Ceiling:, YouTUBE, Apr. 7, 2016, p. 1, retrieved from the Internet: URL:https://www.youtube.com/watch?v=EIIQPBSO5sg.

Wikitude Support: "Wikitude SDK Android 7.0.0 Documentation", Jan. 27, 2017, pp. 1-14. URL:https://www.wikitude.com/external/doc/documentation/7.0/android/instanttracking.html.

International Preliminary Report on Patentability for PCT/US2018/023493 dated Dec. 3, 2019.

* cited by examiner

METHOD AND DEVICE FOR DETECTING PLANES AND/OR QUADTREES FOR USE AS A VIRTUAL SUBSTRATE

RELATED APPLICATION

This application claims priority to U.S. Provisional Patent Application No. 62/514,529, filed on Jun. 2, 2017, and U.S. Non-Provisional patent application Ser. No. 15/978,130, filed May 12, 2018, the entire contents of which are incorporated herein by reference.

TECHNICAL FIELD

This relates generally to detecting planes and/or quadtrees within a scene, including but not limited to electronic devices that enable the detected planes and/or quadtrees to be sued as virtual substrates.

BACKGROUND

Placing augmented reality/virtual reality (AR/VR) objects in an unmapped or dynamic scene presents a challenge from at least a user experience perspective. If an AR/VR object is placed within a scene without a suitable virtual substrate, the AR/VR object may not be anchored to a real-world surface in the scene. As such, the AR/VR may float in mid-air, occlude a real-world object, or collide with a real-world object. This produces a poor user experience that is neither lifelike nor believable.

In embodiments described below, this challenge is solved by detecting planes or quadtrees within the scene and determining their extents in order to provide virtual substrates on which to place AR/VR objects.

SUMMARY

In accordance with some embodiments, a method is performed at an electronic device with one or more processors, non-transitory memory, an image sensor, a display, and one or more input devices. The method includes displaying, on the display, a reticle element in a first appearance state overlaid on a media capture preview of objects in a field of view of the image sensor, where the media capture preview changes as the objects in the field of view of the image sensor change. The method also includes: detecting a plane in the media capture preview; and, in response to detecting the plane, displaying, on the display, the reticle element in a second appearance state overlaid on the media capture preview, where the reticle element corresponds to an indication of a portion of the extent of the plane while displayed in the second appearance state.

In accordance with some embodiments, a method is performed at an electronic device with one or more processors and non-transitory memory. The method includes: obtaining a plurality of sets of images; synthesizing a three-dimensional point cloud for each of the plurality of sets of images; constructing planes using the respective three-dimensional point clouds; and generating a merged set of quadtrees characterizing a merged set of planes across the three-dimensional point clouds.

In accordance with some embodiments, an electronic device includes a display, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and one or more input devices, cause the device to perform or cause performance of the operations of any of the methods described herein. In accordance with some embodiments, an electronic device includes: a display, one or more input devices; and means for performing or causing performance of the operations of any of the methods described herein. In accordance with some embodiments, an information processing apparatus, for use in an electronic device with a display and one or more input devices, includes means for performing or causing performance of the operations of any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

In embodiments described below, while displaying a media capture preview of a scene within the field of view of an image sensor, a reticle element overlaid on the media capture preview transitions from a first appearance state to a second appearance to provide a visual cue that a plane has been detected within the scene. In embodiments described below, while displayed in the second appearance state, the reticle element indicates the extent of the detected plane. Accordingly, the embodiments described below provide a seamless user experience that requires less time and user inputs when placing augmented reality/virtual reality (AR/VR) objects within the scene relative to the detected plane, which is used as a virtual substrate. This also reduces power usage and improves battery life of the device by enabling the user to use the device more quickly and efficiently.

In embodiments described below, sets of planes or quadtrees for different vantage points or fields of view are correlated across a temporal dimension to obtain a merged set of quadtrees, which are in turn used as virtual substrates. As such, the embodiments described below provide a process for identifying accurate extents of virtual substrates based on different fields of view of a scene over time. Accordingly, the embodiments described below provide a seamless user experience that requires less time and user inputs when placing AR/VR objects within the scene relative to the merged set of quadtrees (or planes associated therewith). This also reduces power usage and improves battery life of the device by enabling the user to use the device more quickly and efficiently.

Figure 7:
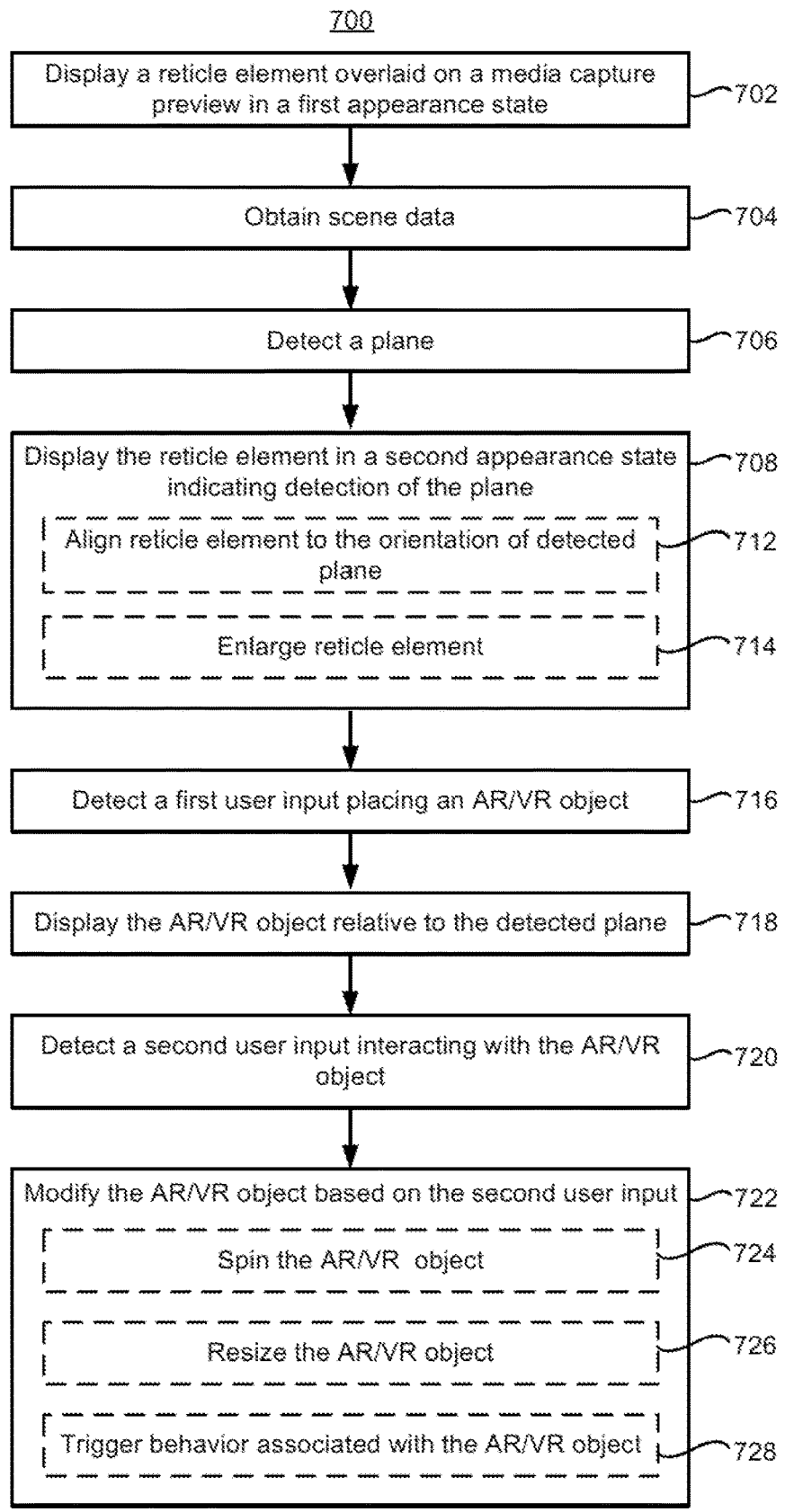
FIG. 7 illustrates a flow diagram of a method of detecting a virtual substrate and placing objects thereon in accordance with some embodiments.
Figure 8:
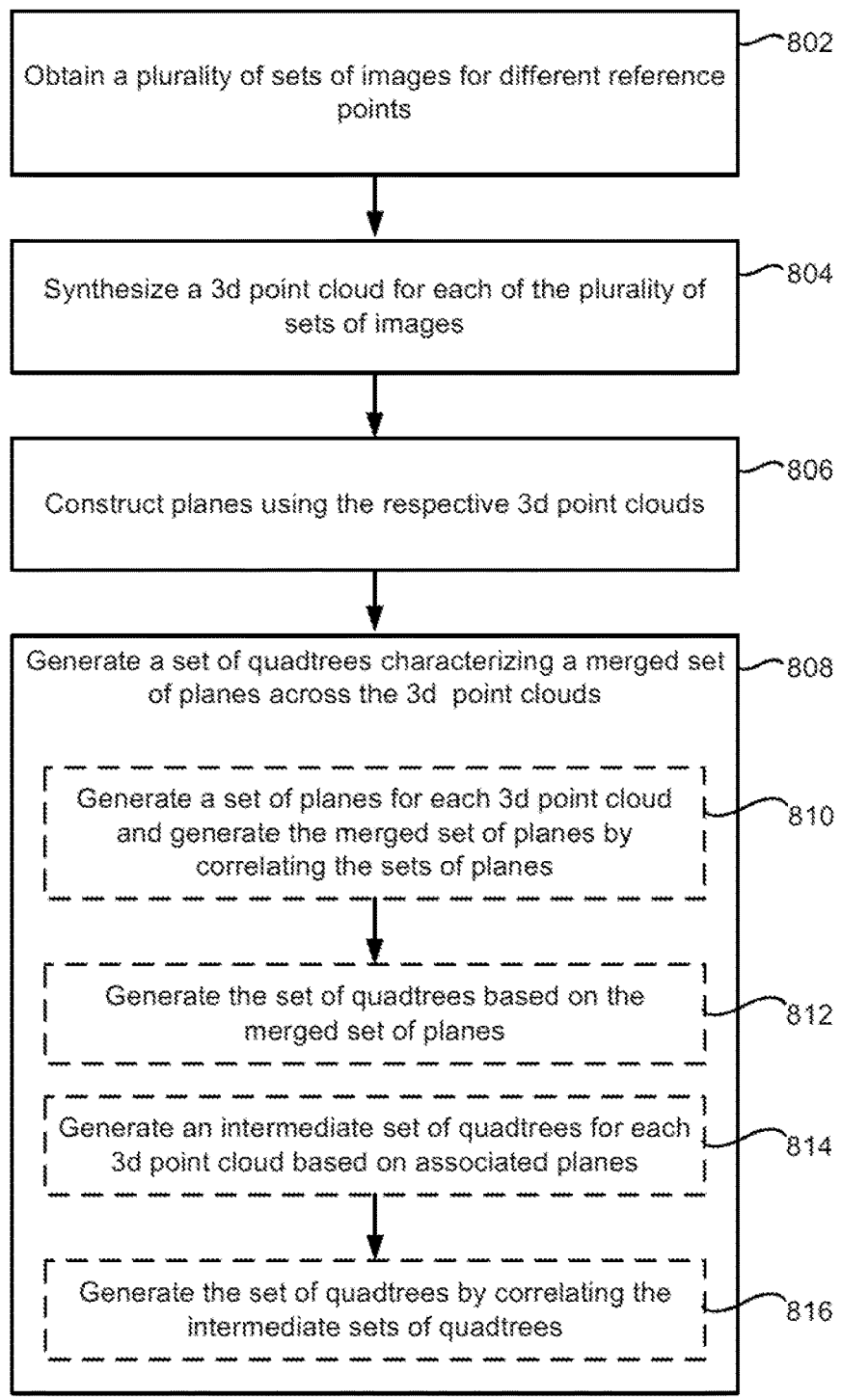
FIG. 8 illustrates a flow diagram of a method of generating a merged set of quadtrees for use as a virtual substrate in accordance with some embodiments.
Figure 9:
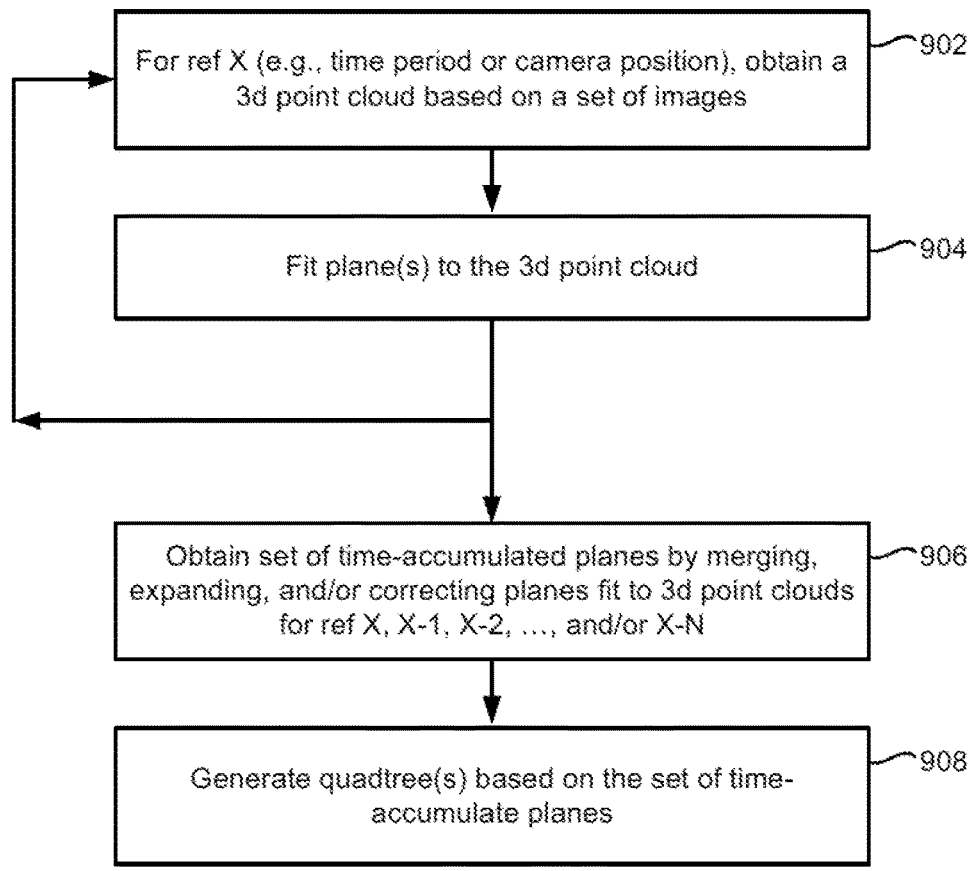
FIG. 9 illustrates a flow diagram of a method of generating a set of quadtrees for use as a virtual substrate in accordance with some embodiments.
Figure 10:
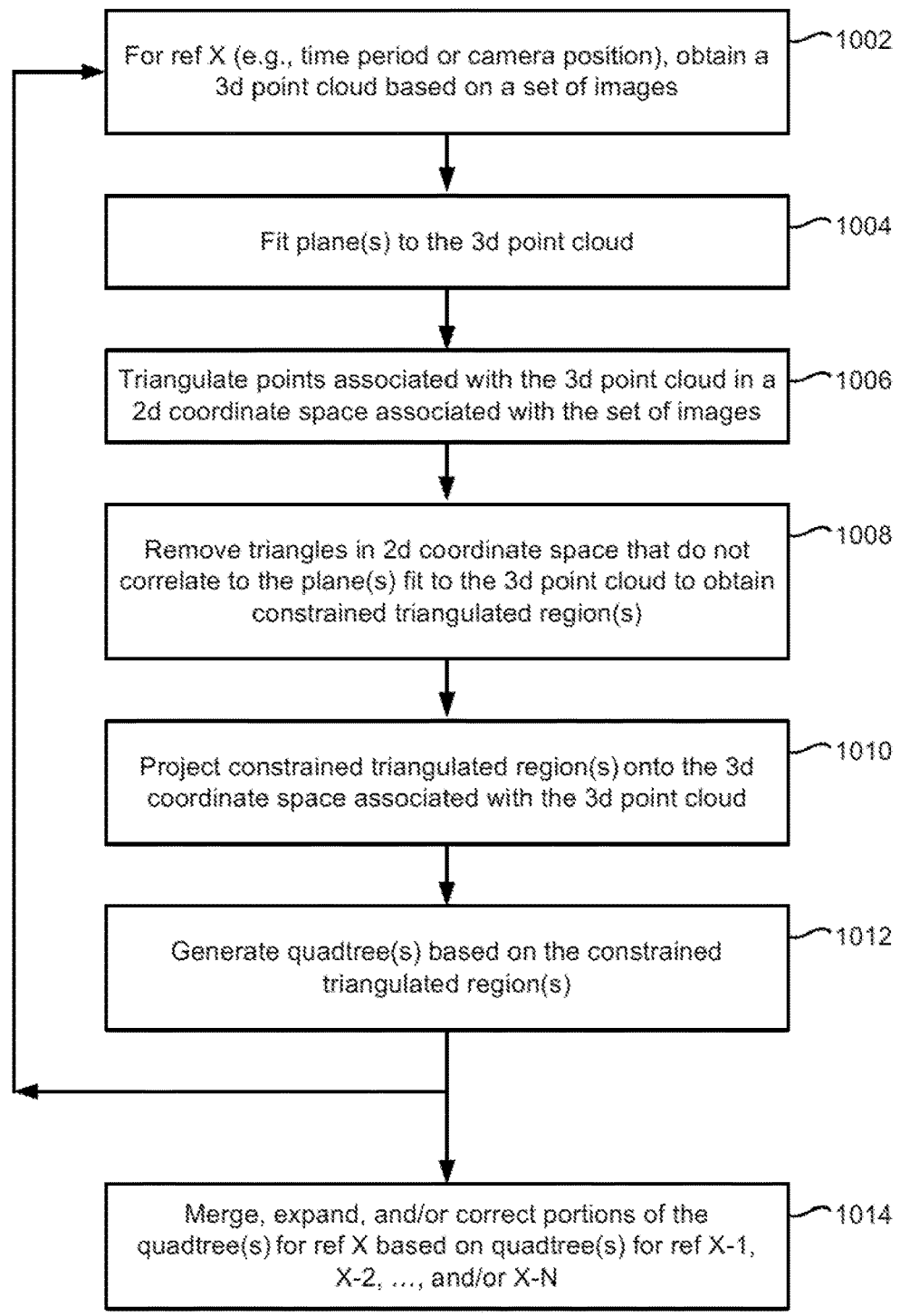
FIG. 10 illustrates a flow diagram of a method of generating a merged set of quadtrees for use as a virtual substrate in accordance with some embodiments.

Below, FIGS. 1A-1B, 2-3, and 11 provide a description of example devices. FIG. 7 illustrates a flow diagram of a method of detecting a virtual substrate and placing objects thereon. The user interfaces in FIGS. 4A-4M are used to illustrate the process in FIG. 7. FIGS. 8-10 illustrate flow diagrams of methods of generating a set of quadtrees for use as a virtual substrate. The abstract block diagrams in FIGS. 5A-5B and the user interfaces in FIGS. 6A-6G are used to illustrate the processes in FIGS. 8-10.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an email application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
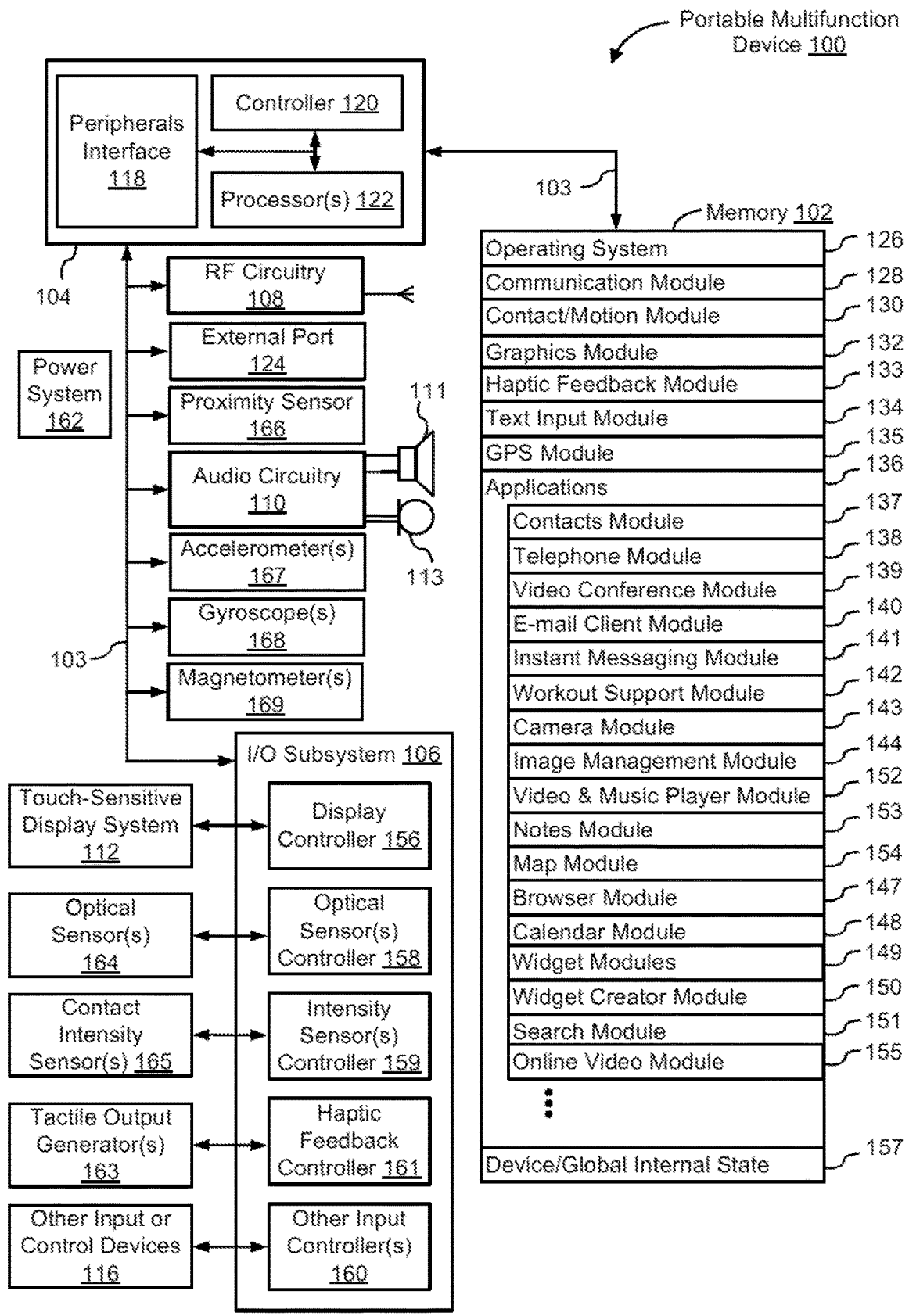
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random-access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with: a personal area network (PAN), such as a BLUETOOTH network; a local area network (LAN), such as an 802.11x Wi-Fi network; and/or a wide area network (WAN), such as a 4G cellular network.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (sometimes also referred to herein as the "image sensor" or the "camera assembly"). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

Figure 3:
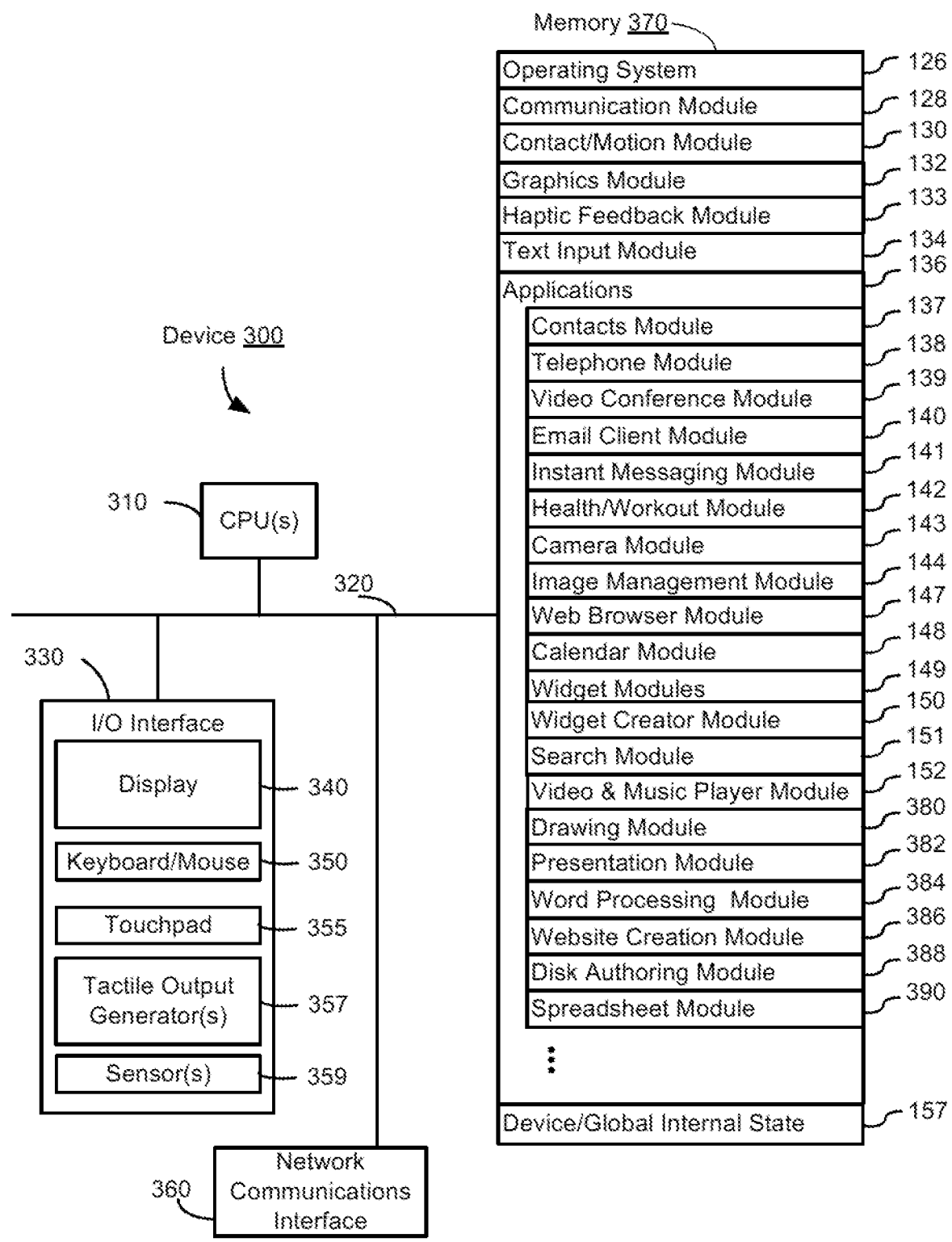
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, MacOS, Darwin, LINUX, UNIX, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts module 137, email muddle 140, IM module 141, web browser module 147, and/or any other applications that accept text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof: contacts module 137 (sometimes called an address book or contact list); telephone module 138; video conferencing module 139; email client module 140; instant messaging (IM) module 141; health/workout module 142; camera module 143 for still and/or video images; image management module 144; web browser module 147; calendar module 148; widget modules 149, which optionally include one or more of: weather widget, stocks widget, calculator widget, alarm clock widget, dictionary widget, and other widgets obtained by the user, as well as user-created widgets; widget creator module 150 for making user-created widgets; search module 151; video and music player module 152, which is, optionally, made up of a video player module and a music player module; notes module 153; map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
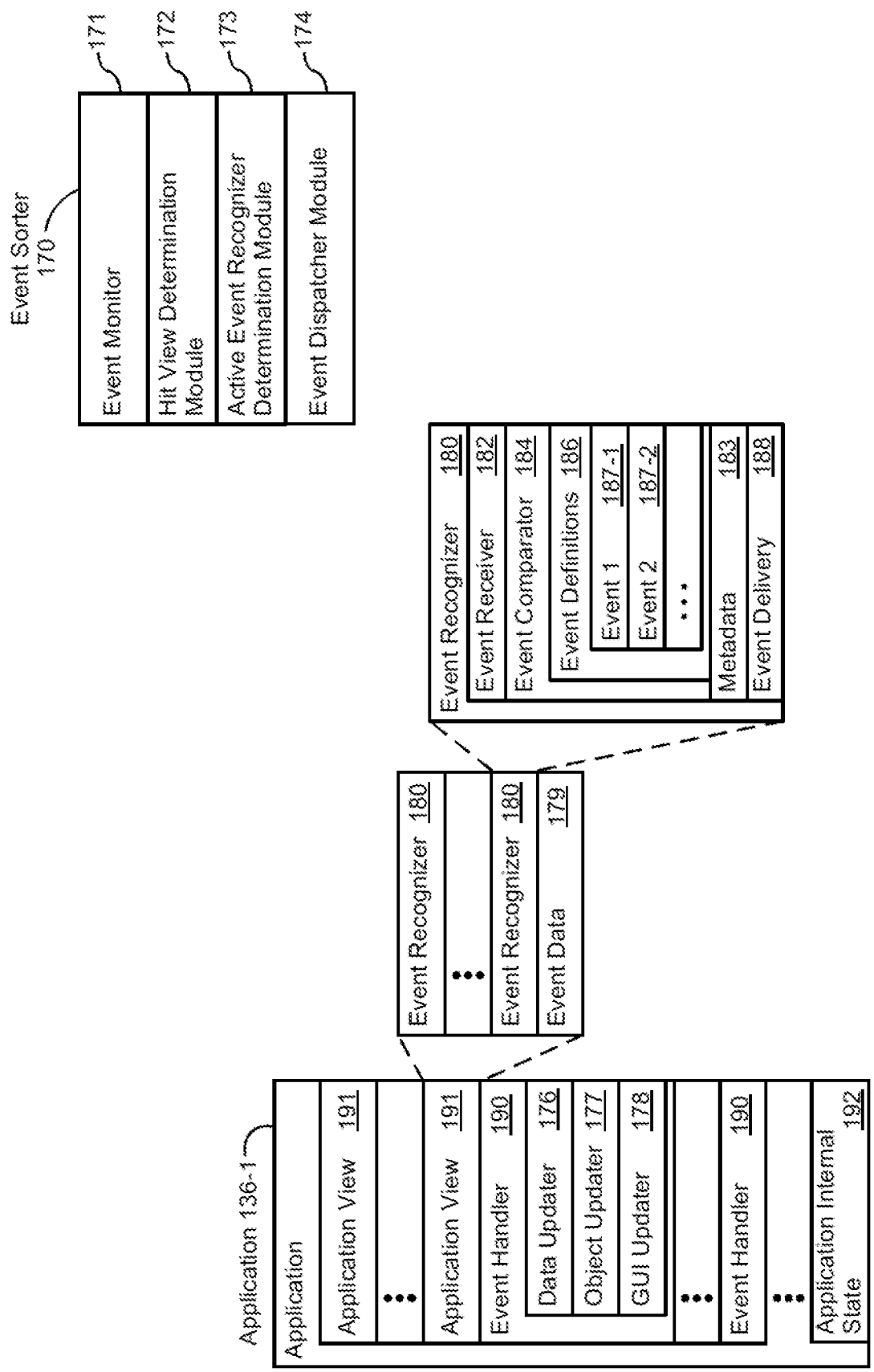
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In some embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
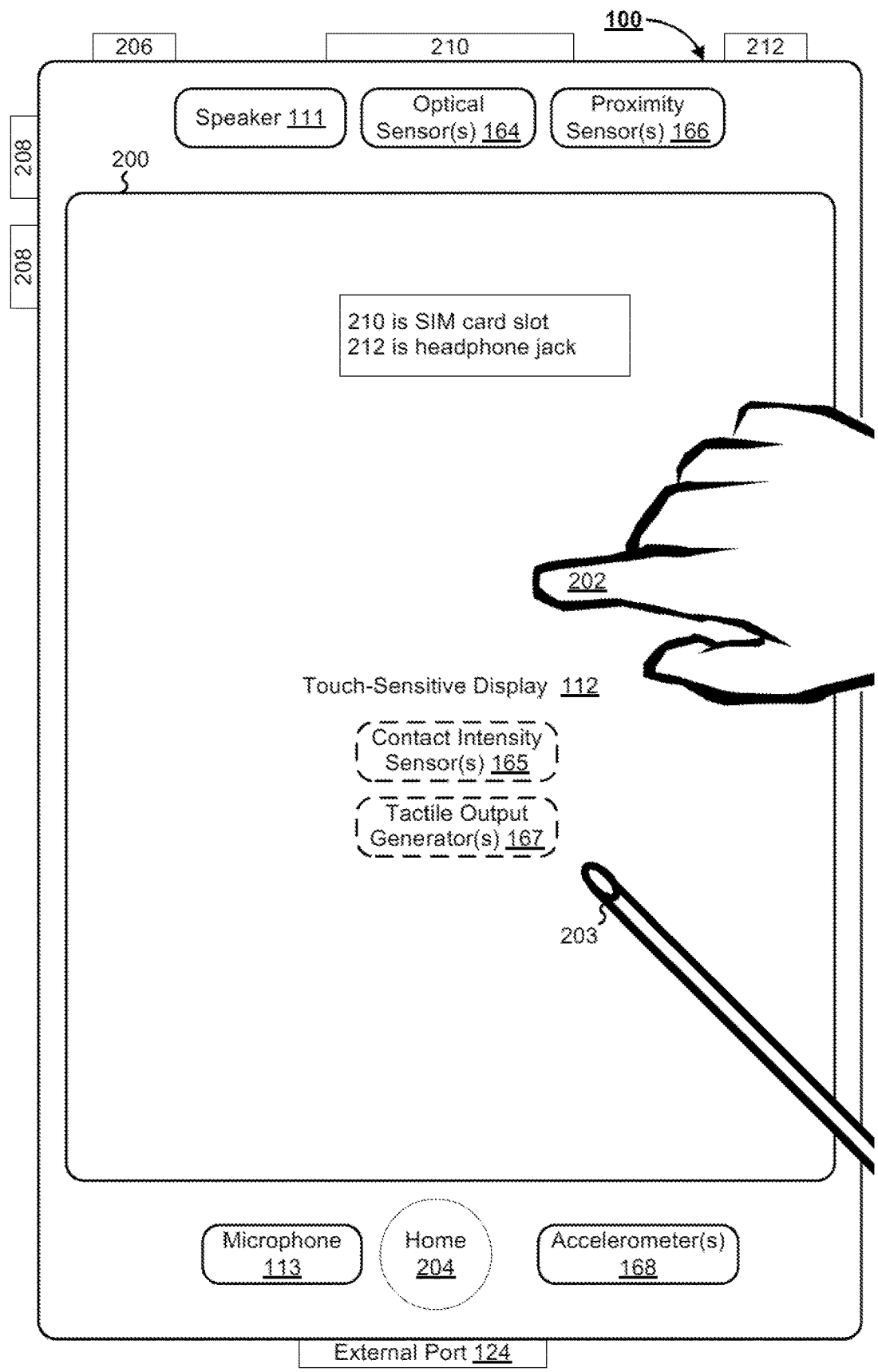
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some embodiments or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164,

165, 166, 167, 168, and 169 described above with reference to FIG. 1A). Memory 370 includes high-speed random-access memory, such as DRAM, SRAM, DDR RAM or other random access solid-state memory devices; and optionally includes non-volatile memory, such as one or more magnetic disk storage devices, optical disk storage devices, flash memory devices, or other non-volatile solid-state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

User Interfaces and Associated Processes

Attention is now directed toward embodiments of user interfaces ("UI") and associated processes that may be implemented on an electronic device, such as a portable multifunction device (PMD) 100 with a display, a touch-sensitive surface, and optionally one or more sensors to detect intensity of contacts with the touch-sensitive surface, or a device 300 with one or more processors, non-transitory memory, a display, and an input device.

While the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

FIGS. 4A-4M illustrate example user interfaces for detecting a virtual substrate and placing objects thereon in accordance with some embodiments. The user interfaces in these figures are used to illustrate the processes described below, including the process in FIG. 7. Although some of the examples which follow will be given with reference to inputs on a touch-screen display (where the touch-sensitive surface and the display are combined), in some embodiments, the device detects inputs via an input device that is separate from the display (e.g., a laptop with a separate touchpad and display, or a desktop with a separate mouse and display).

Figure 4A:
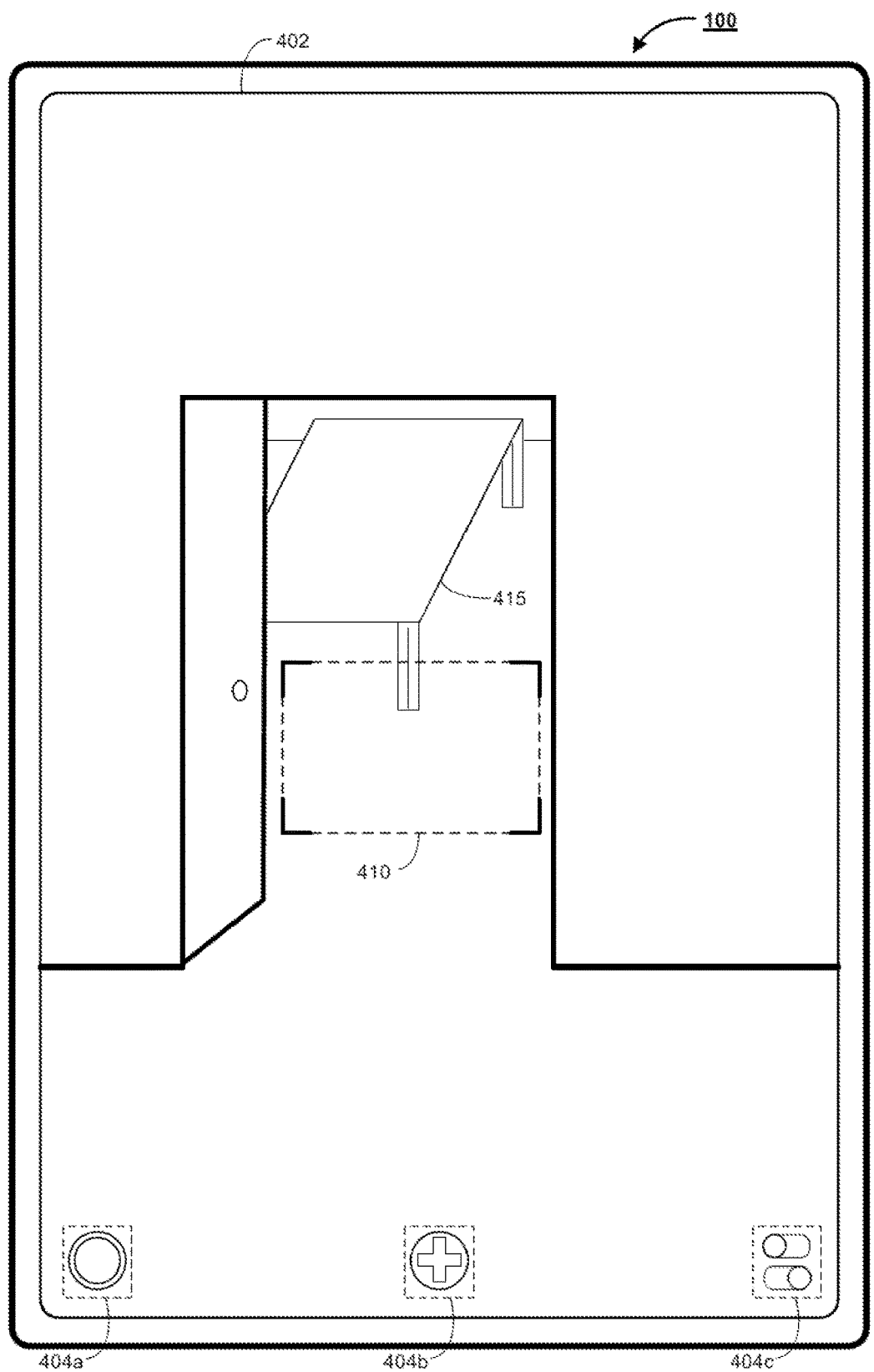
FIGS. 4A-4M illustrate example user interfaces for detecting a virtual substrate and placing objects thereon in accordance with some embodiments.

As shown in FIG. 4A, the device 100 displays a media capture/interaction interface 402 provided to detect planes and place augmented reality and/or virtual reality (AR/VR) objects thereon. According to some embodiment, the media capture/interaction interface 402 corresponds to a media capture preview of a scene with objects in a field of view of an image sensor of the device that changes as the field of view of the image sensor changes. For example, in FIG. 4A, the media capture preview includes an open doorway to a room with a table 415 therein.

Figure 4B:
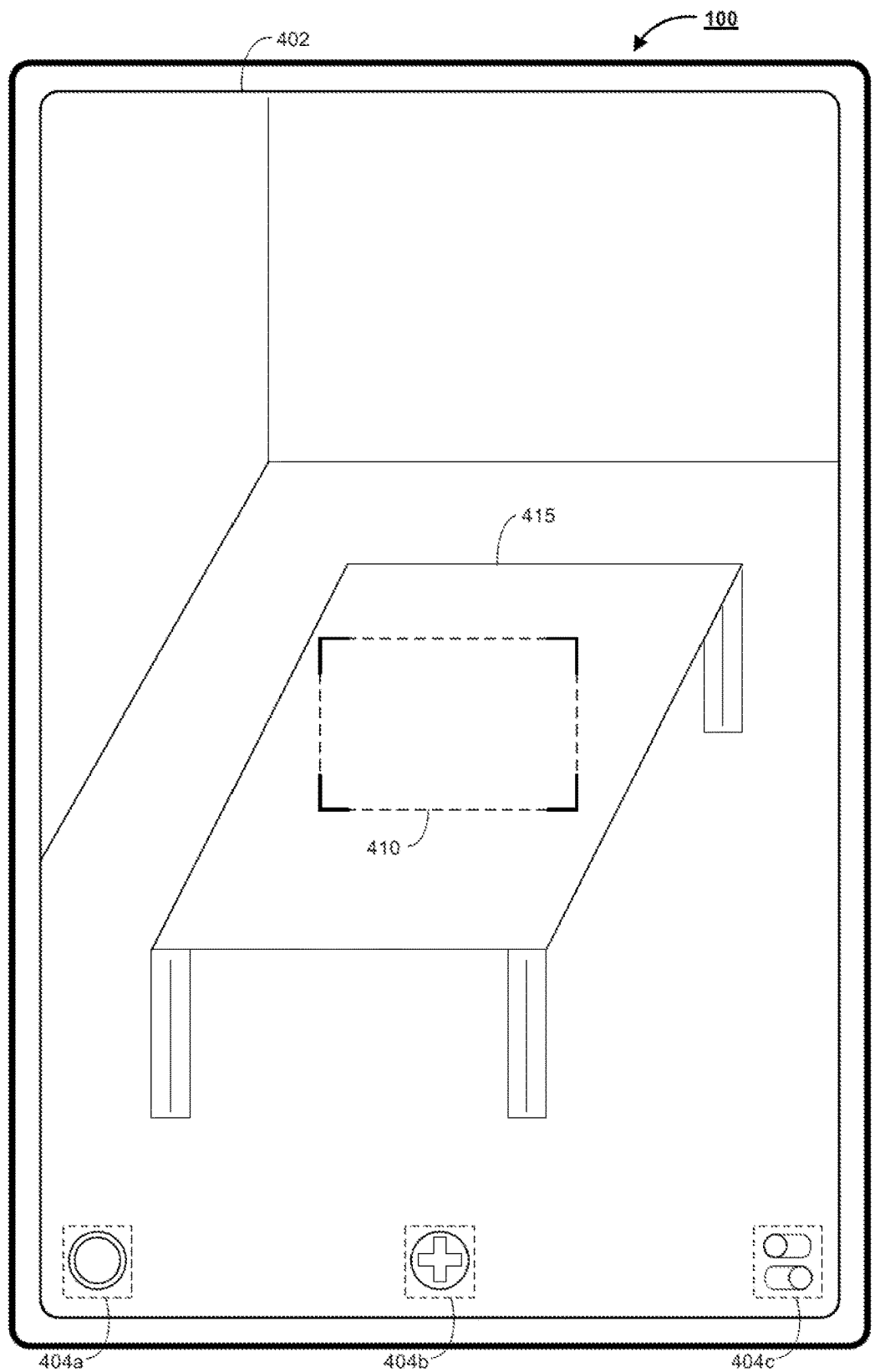
Figure 4C:
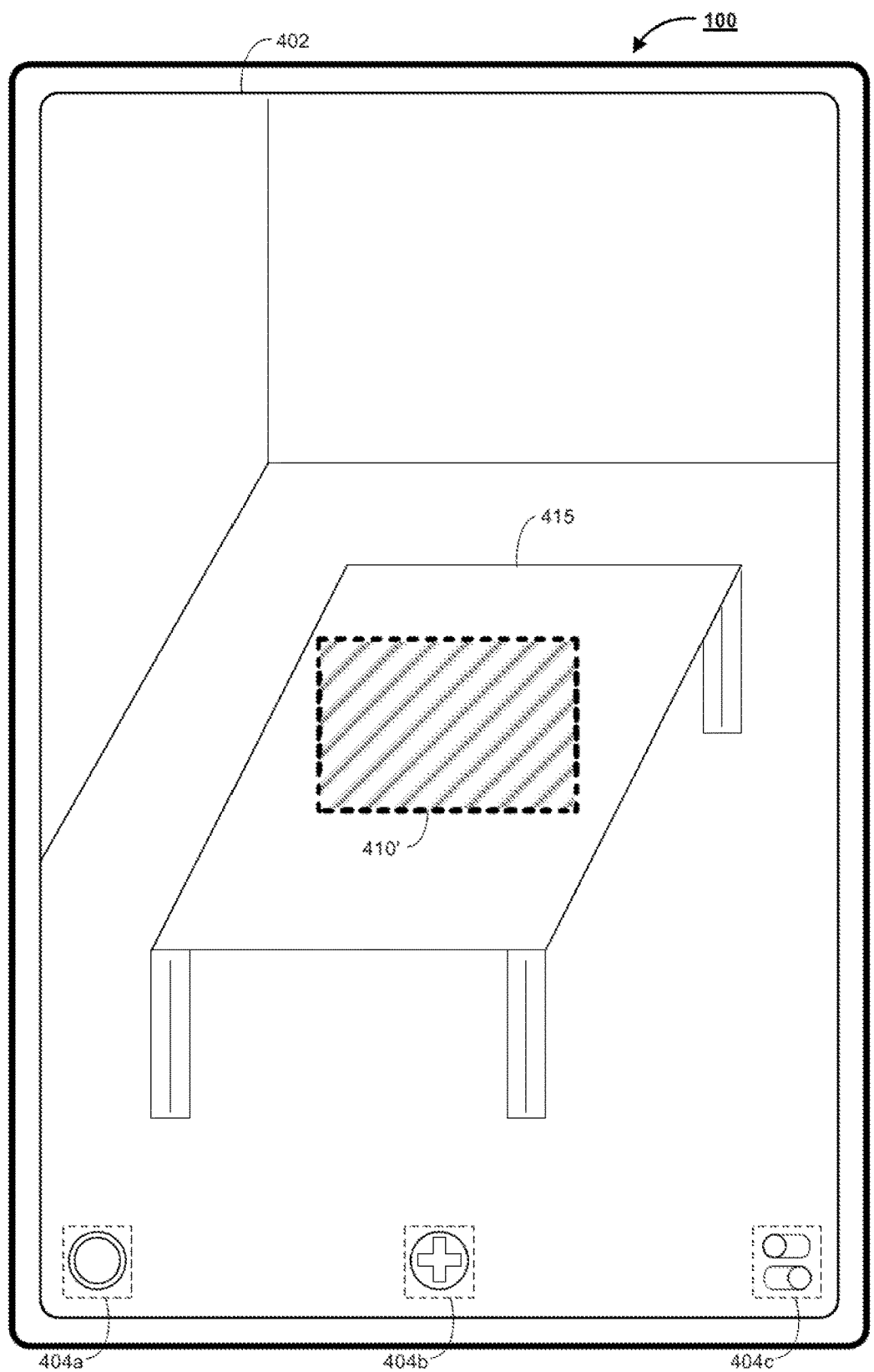
Figure 4D:
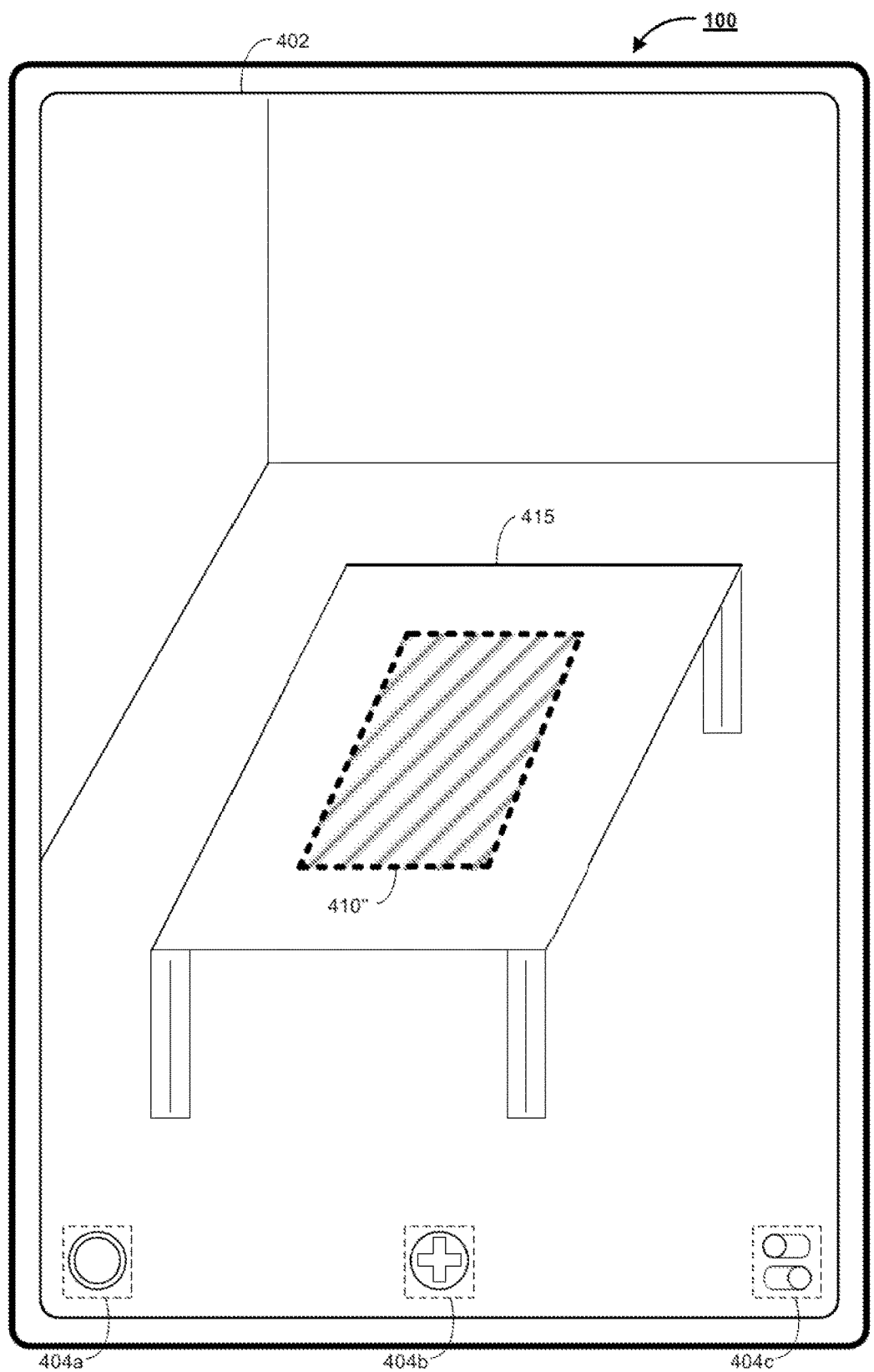
Figure 4E:
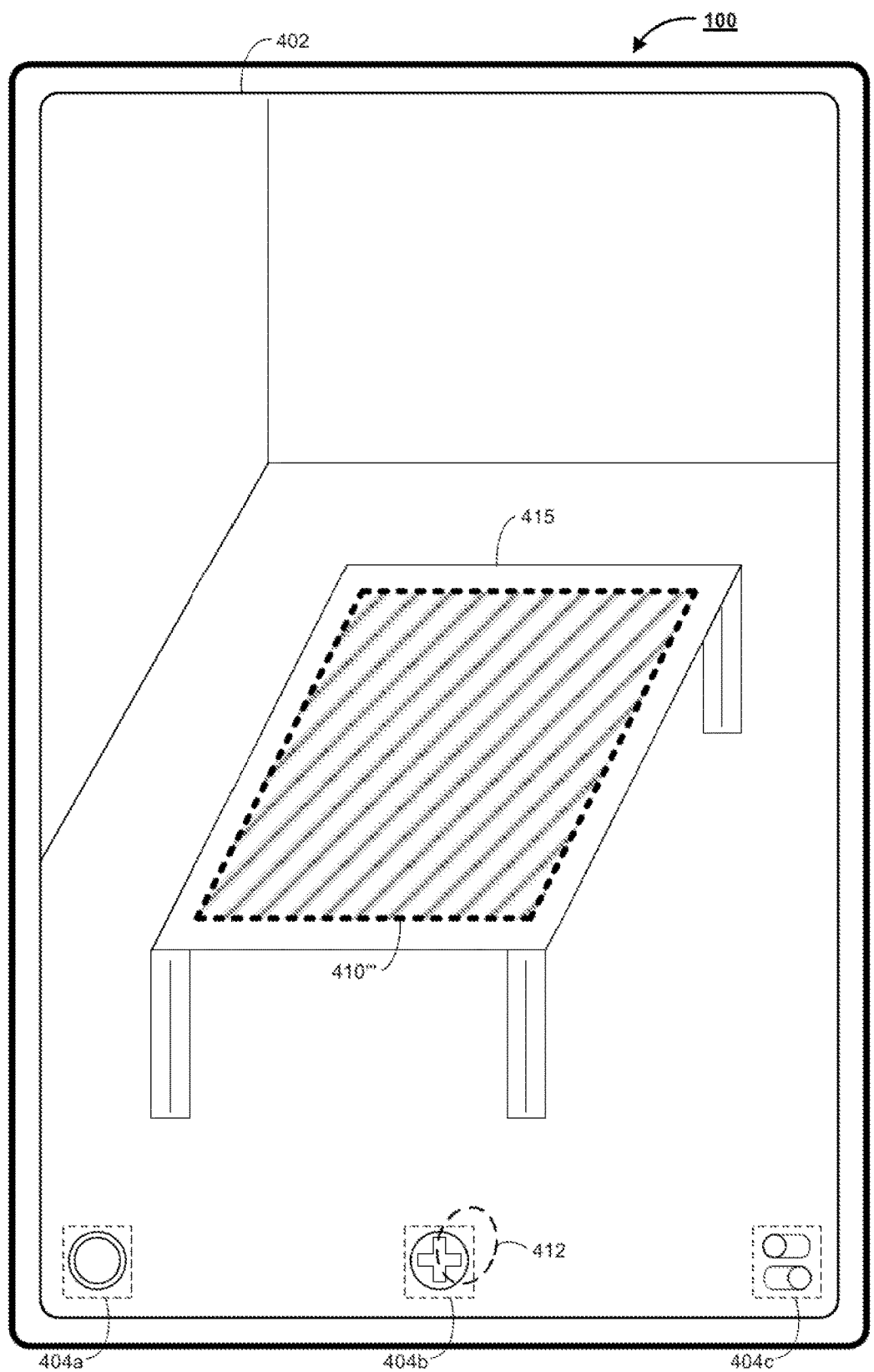
Figure 4F:
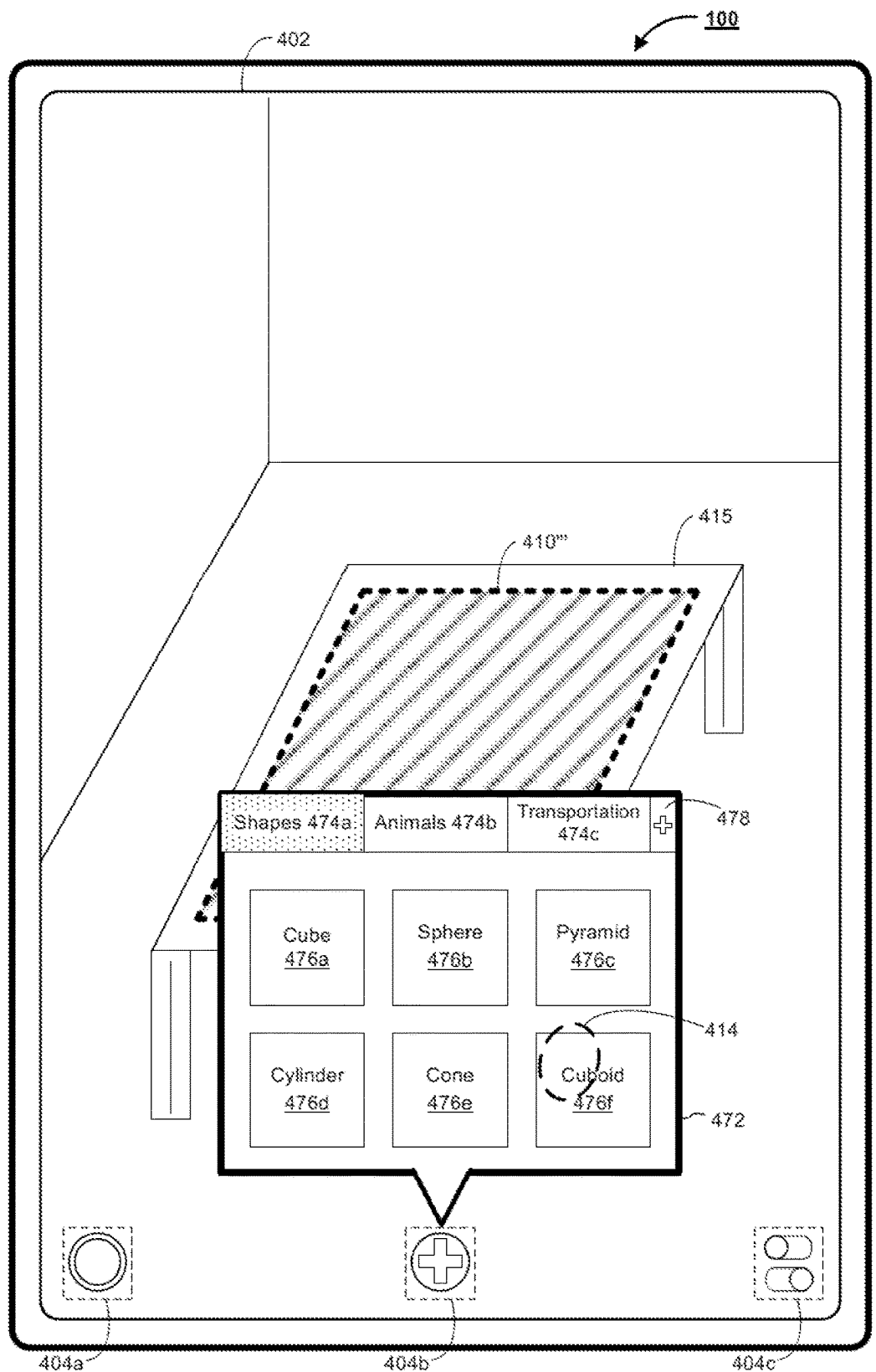

In FIG. 4A, the media capture/interaction interface 402 includes: a snapshot affordance 404a provided to capture an image in response to selection thereof (e.g., with a contact or selection gesture); an AR/VR object menu affordance 404b provided to display an object selection interface (e.g., as shown in FIGS. 4E-4F) in response to selection thereof (e.g., with a contact or selection gesture); and an options affordance 404c provided to display an options and/or settings menu in response to selection thereof (e.g., with a contact or selection gesture). In FIG. 4A, the media capture/interaction interface 402 also includes a reticle element displayed in a first appearance state 410. As shown in FIG. 4A, in the first appearance state 410, the reticle element corresponds to a transparent rectangle with opaque corners but no edges. In some embodiments, the reticle element corresponds to a rectangle, an ellipse, a polygon, a magnifying glass, a crosshair, or the like.

FIGS. 4A-4B show a sequence in which the media capture/interaction interface 402 is updated based on a change of the field of view of the image sensor of the device 100. For example, in FIG. 4B, the media capture preview includes two walls of the room with the table 415 therein. As such, the perspective or vantage point of the device 100 changes between FIGS. 4A-4B.

FIGS. 4B-4C show a sequence in which the appearance state of the reticle element changes from the first to the second appearance state in response to detecting a plane proximate thereto. For example, the device 100 detects a plane associated with the table 415. Continuing with this example, in response to detecting the plane, the device 100 changes the reticle element from the first appearance state 410 to the second appearance state 410'. As shown in FIG. 4C, in second appearance state 410', the reticle element corresponds to a shaded rectangle with dotted edges. In some embodiments, in second appearance state 410', the edges of the reticle element blink or flash. In some embodiments, in second appearance state 410', the edges of the reticle element blink or flash in a clockwise or counter-clockwise manner. According to some embodiments, while displayed in the second appearance state 410', the reticle element provides a visual cue that the device 100 has detected a plane within the scene. According to some embodiments, while displayed in the second appearance state 410', the reticle element provides a visual indication of a portion of the extent of the detected plane associated with the table 415.

FIGS. 4C-4D show a sequence in which the appearance state of the reticle element changes from the second to the third appearance state in response to detecting an orientation of the plane. For example, in FIG. 4D, the device 100 displays the reticle element in a third appearance state 410" by spinning and/or aligning the reticle element to the orientation of the detected plane associated with the table 415.

FIGS. 4D-4E show a sequence in which the appearance state of the reticle element changes from the third to the fourth appearance state in response to detecting a larger extent of the plane. For example, in FIG. 4E, the device 100 displays the reticle element in a fourth appearance state 410''' by enlarging the area of the reticle element in response to detecting additional points associated with the plane indicating that its extent is greater than previously detected.

Figure 4G:
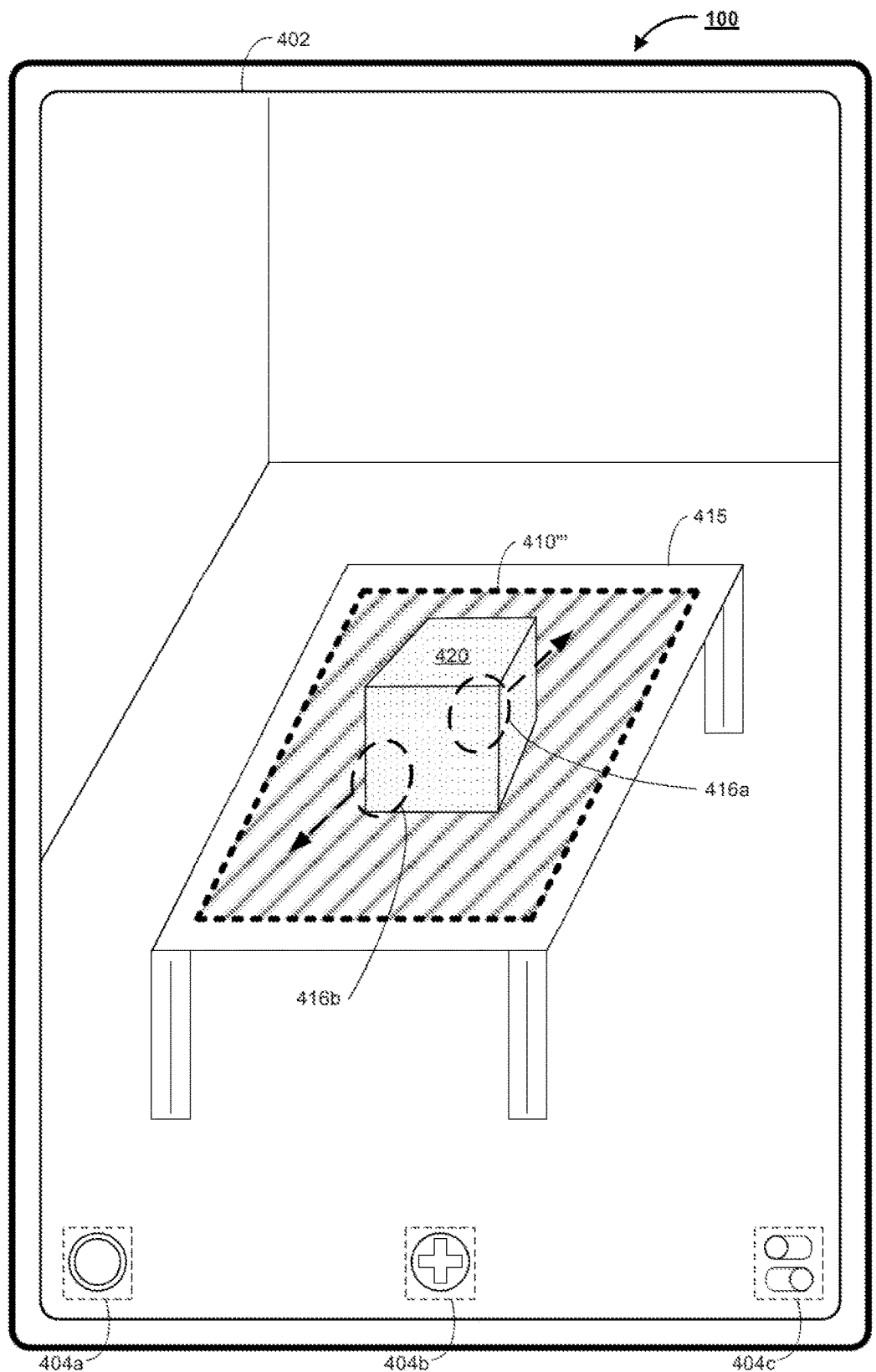

FIGS. 4E-4G show a sequence in which an AR/VR object is placed within the scene relative to the detected plane. As shown in FIG. 4E, the device 100 detects a contact 412 (e.g., a tap or selection gesture) at a location that corresponds to the AR/VR object menu affordance 404b. As shown in FIG. 4F, the device 100 displays the object selection interface 472 overlaid on the media capture/interaction interface 402 in response to detecting the selection of the AR/VR object menu affordance 404b in FIG. 4E.

In FIG. 4F, the object selection interface 472 includes a plurality of AR/VR object category tabs 474a, 474b, and 474c associated with shapes, animals, and transportation, respectively. In FIG. 4F, the AR/VR object category tabs 474a associated with shapes is currently selected. As a result, the object selection interface 472 includes a plurality of user-selectable AR/VR objects 476a, 476b, 476c, 476d, 476e, and 476f (sometimes collectively referred to herein as the "user-selectable AR/VR objects 476") associated with the shapes category. In some embodiments, each of the user-selectable AR/VR objects 476 is associated with a name, a preview image, associated metadata, and/or the like. In FIG. 4F, the object selection interface 472 also includes an additional categories affordance 478 provided to display additional categories of AR/VR objects in response to selection thereof (e.g., with a contact or selection gesture).

As shown in FIG. 4F, the device 100 detects a contact 414 (e.g., a tap or selection gesture) at a location that corresponds to the user-selectable AR/VR object 476f (e.g., the cuboid object). As shown in FIG. 4G, the device 100 displays a cuboid AR/VR object 420 within the scene relative to the detected plane in response to detecting the selection of the user-selectable AR/VR object 476f in FIG. 4F. In some embodiments, the device displays the cuboid AR/VR object 420 on the geometric center (e.g., the centroid) of the detected plane.

Figure 4H:
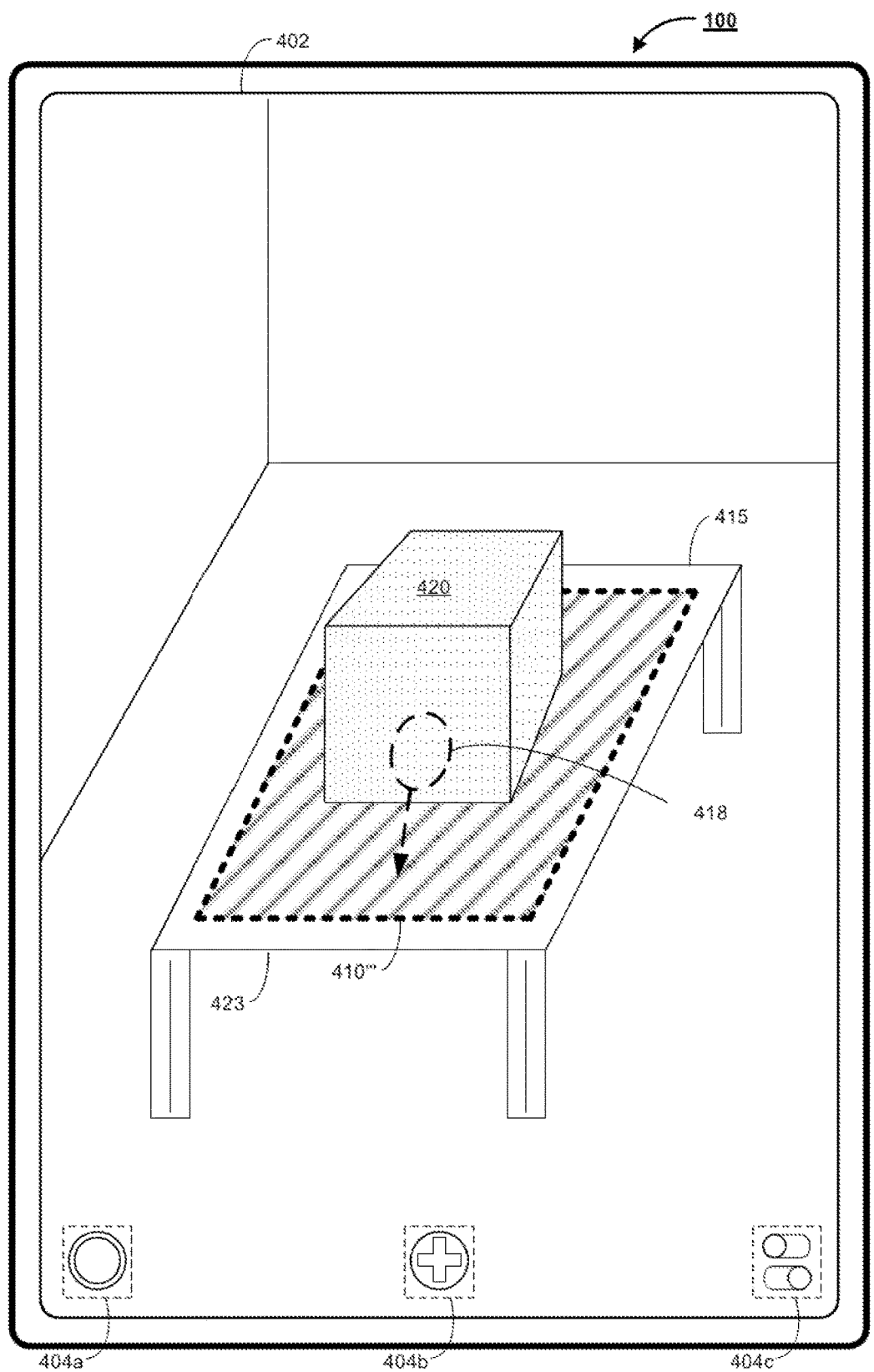

FIGS. 4G-4H show a sequence in which the size of the cuboid AR/VR object 420 increases. As shown in FIG. 4G, the device 100 detects a reverse pinch gesture with contacts 416a and 416b on the cuboid AR/VR object 420. As shown in FIG. 4H, the device 100 increases the size of the cuboid AR/VR object 420 within the scene relative to the detected plane in response to detecting the reverse pinch gesture in FIG. 4G.

Figure 4I:
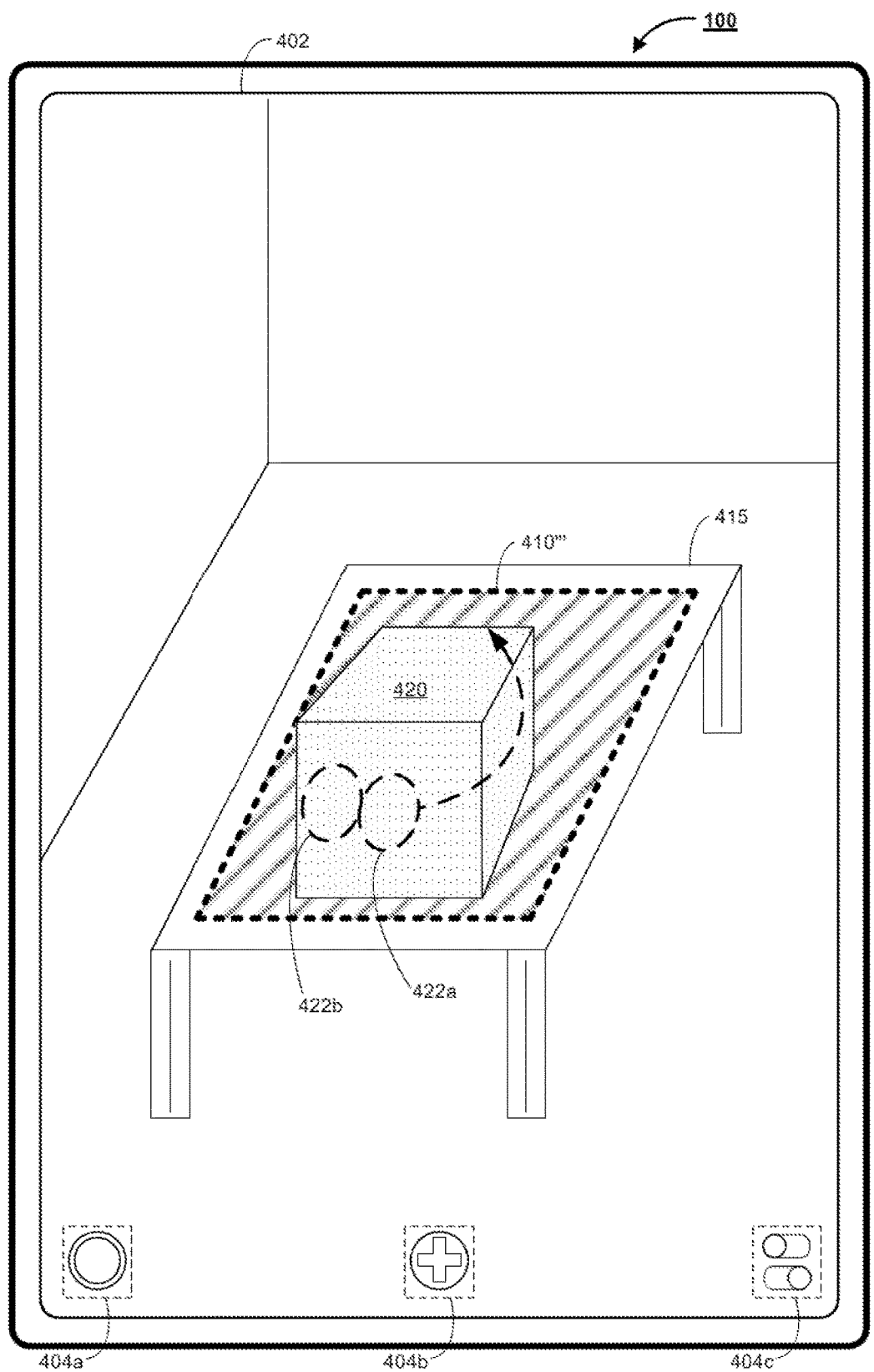

FIGS. 4H-4I show a sequence in which the cuboid AR/VR object 420 moves relative to the detected plane. As shown in FIG. 4H, the device 100 detects a tap-and-drag gesture with contact 418 on cuboid AR/VR object 420. As shown in FIG. 4I, the device 100 displays the cuboid AR/VR object 420 closer to the front edge 423 of the table 415 relative to the detected plane in response to detecting the tap-and-drag gesture in FIG. 4H.

Figure 4J:
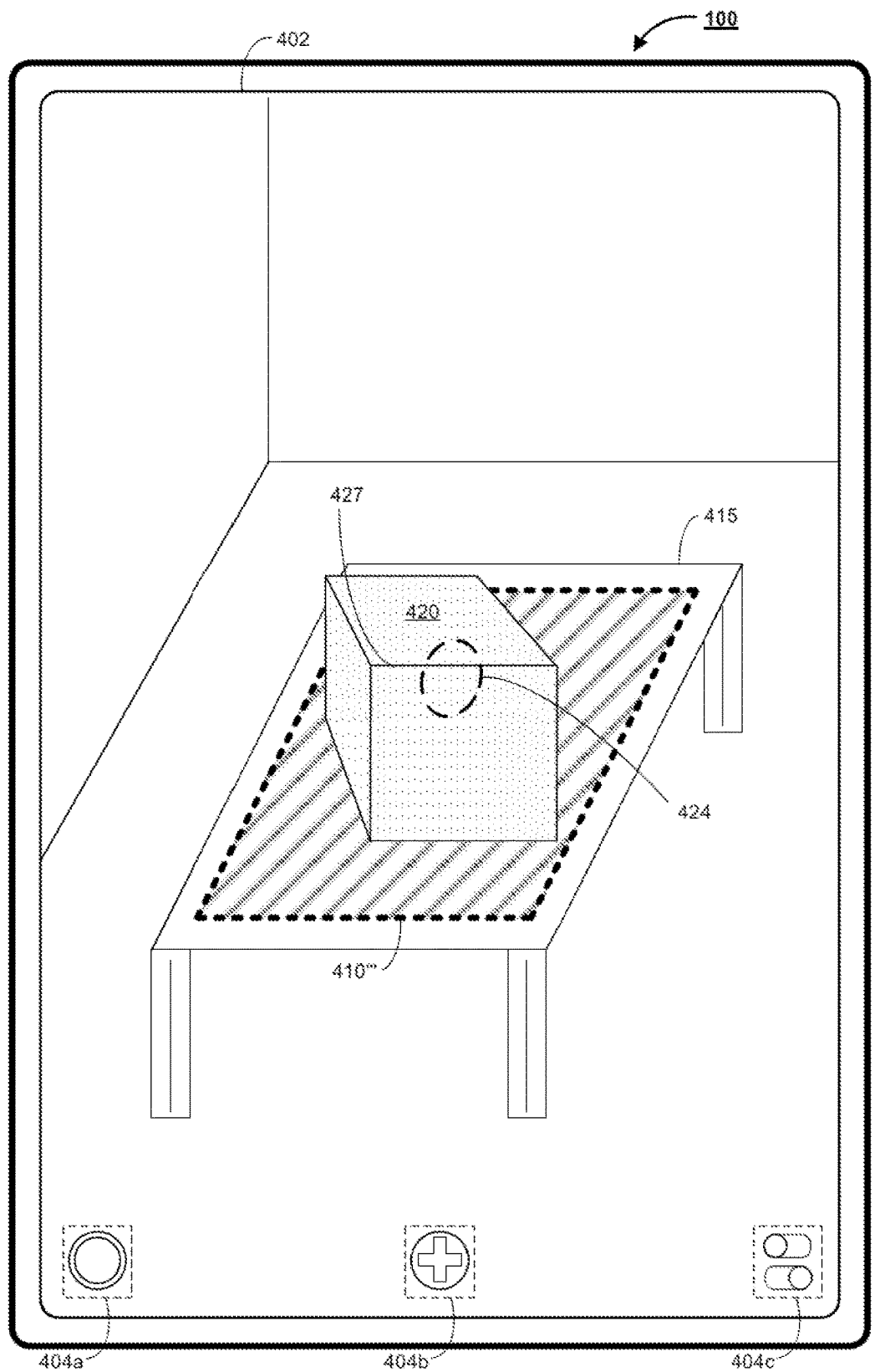

FIGS. 4I-4J show a sequence in which the orientation of the cuboid AR/VR object 420 is changed. As shown in FIG. 4I, the device 100 detects a counter-clockwise spin gesture with contacts 422a and 422b that on the cuboid AR/VR object 420. As shown in FIG. 4J, the device 100 spins the cuboid AR/VR object 420 counter-clockwise within the scene relative to the detected plane in response to detecting the counter-clockwise spin gesture in FIG. 4I.

Figure 4K:
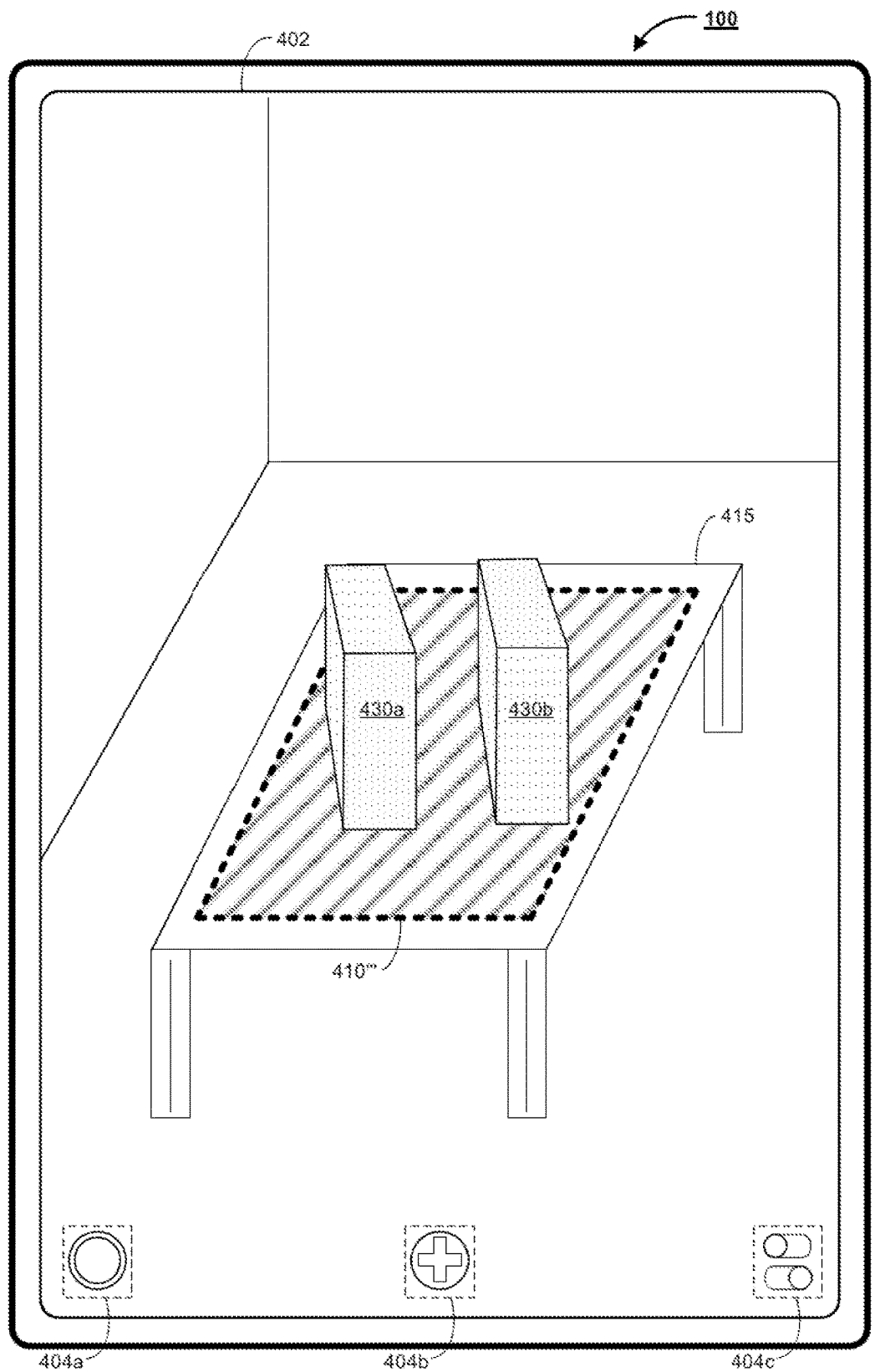

FIGS. 4J-4K show a sequence in which the cuboid AR/VR object 420 is split into cuboid AR/VR objects 430a and 430b. As shown in FIG. 4J, the device 100 detects a predefined interaction gesture (e.g., a single or double tap gesture) with contact 424 at a location that corresponds to the middle front top edge 427 of the cuboid AR/VR object 420. As shown in FIG. 4K, the device 100 splits the cuboid AR/VR object 420 into the cuboid AR/VR objects 430a and 430b based on the location of the interaction gesture in FIG. 4H and displays the cuboid AR/VR objects 430a and 430b relative to the detected plane.

Figure 4L:
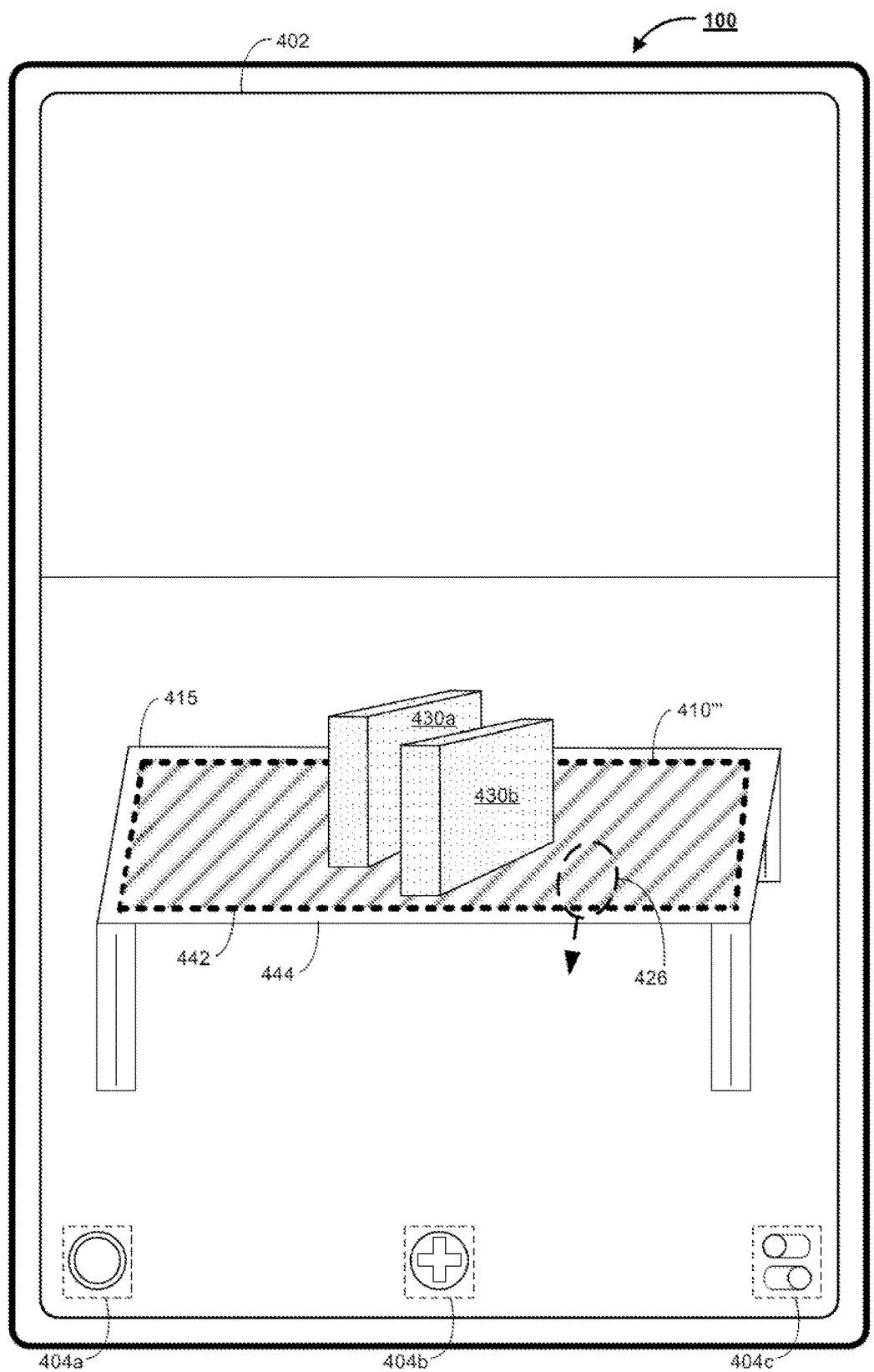

FIGS. 4K-4L show a sequence in which the media capture/interaction interface 402 is updated based on a change of the field of view of the image sensor of the device 100. For example, in FIG. 4L, the media capture preview includes a single wall of the room with the table 415 therein. As such, the perspective or vantage point of the device 100 changes, and the perspective of the cuboid AR/VR objects 430a and 430b changes accordingly.

Figure 4M:
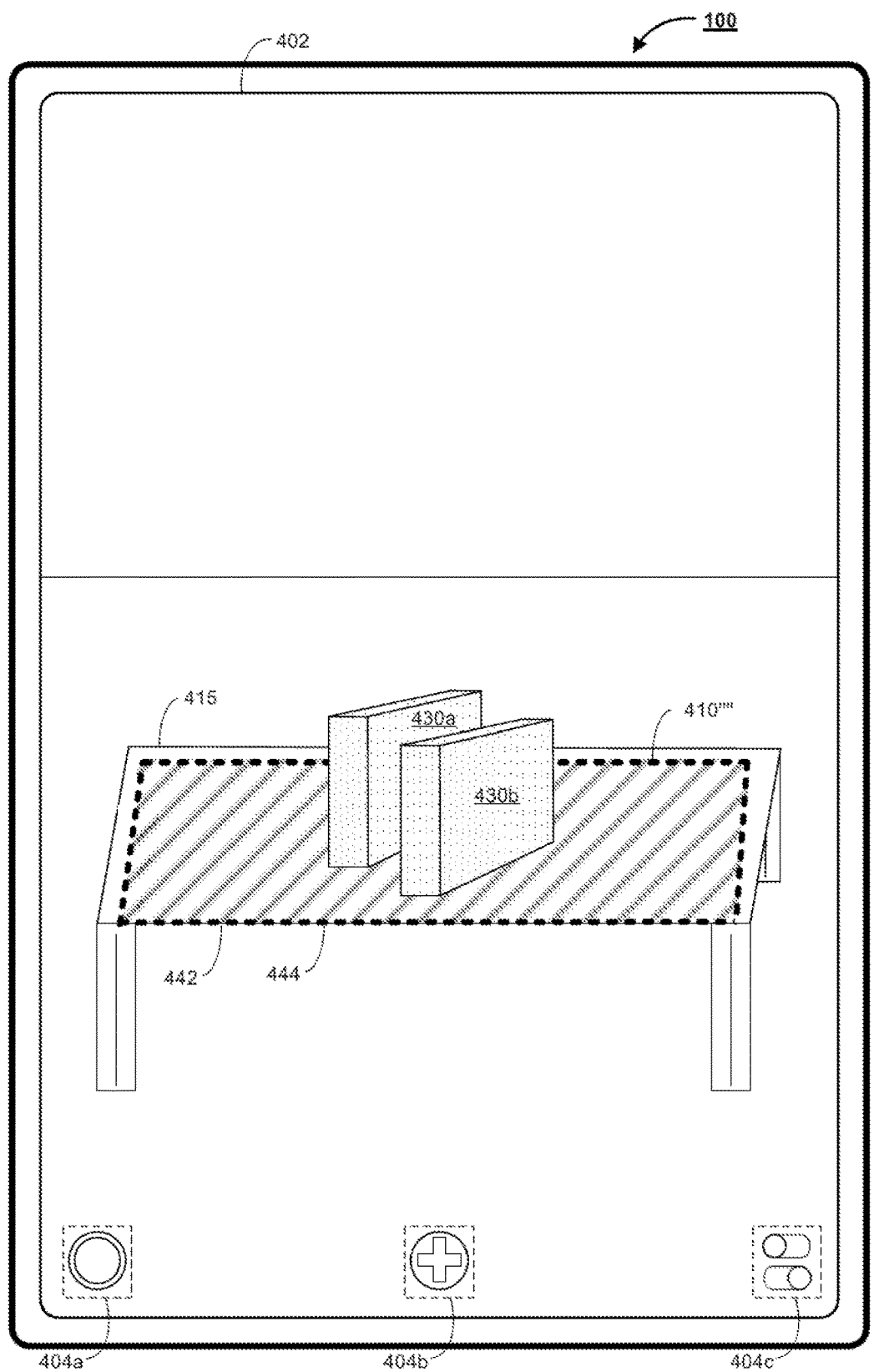

FIGS. 4L-4M show a sequence in which the appearance state of the reticle element changes from the fourth to the fifth appearance state in response to detecting a user input interacting with an edge of the reticle element. As shown in FIG. 4L, the device 100 detects a tap-and-drag gesture with contact 426 whereby an edge 442 of the reticle element is dragged towards the edge 444 of the table 415. For example, in FIG. 4M, the device 100 displays the reticle element in a fifth appearance state 410'''' by increasing the size of the reticle element in response to detecting the tap-and-drag gesture in FIG. 4L.

Figure 5A:
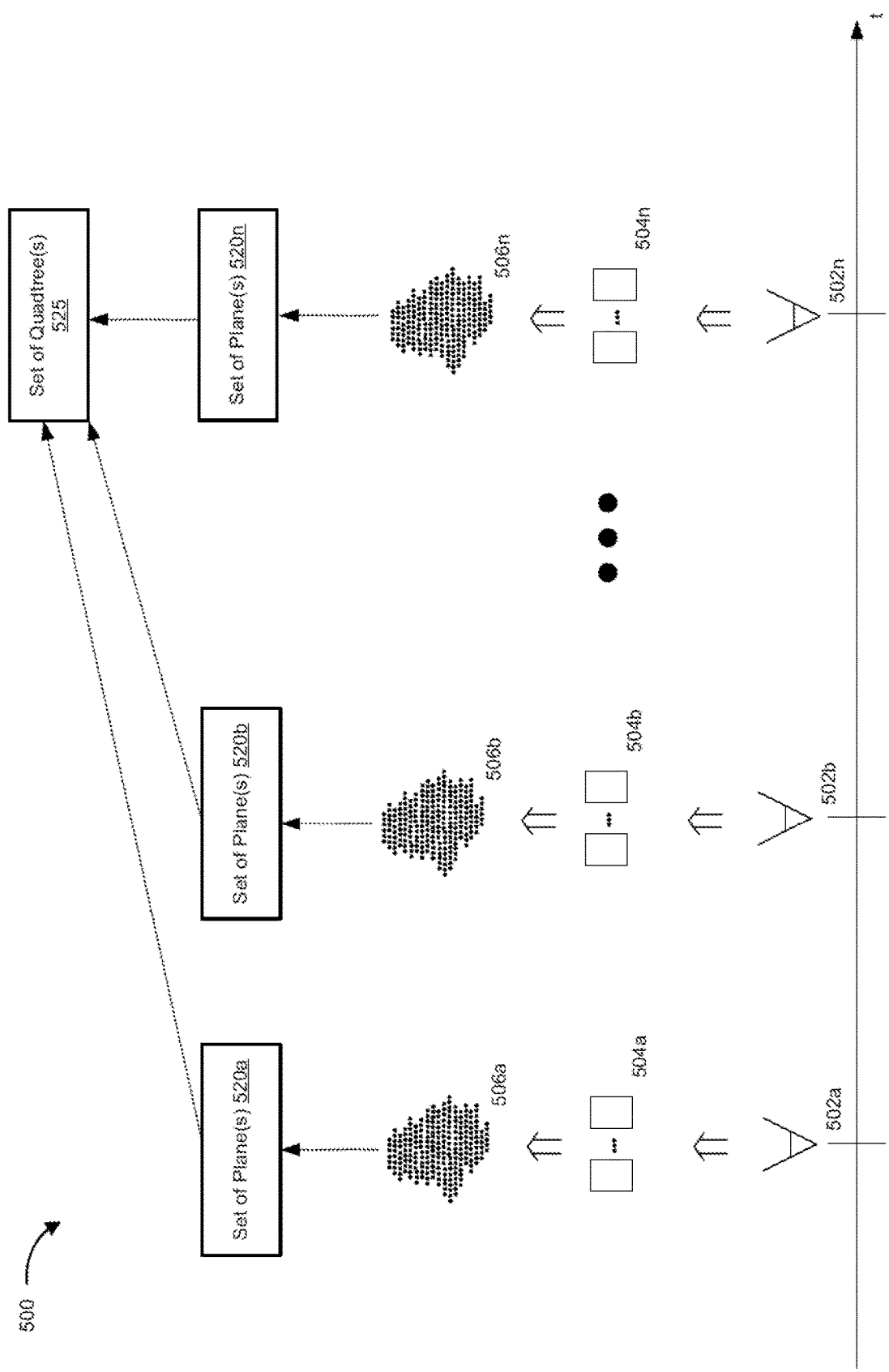
FIGS. 5A-5B illustrate example abstract block diagrams for generating a set of quadtrees in accordance with some embodiments.

FIG. 5A illustrates an abstract block diagram associated with a process 500 for generating a set of quadtrees in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. For example, in some embodiments, in process 500 the set of quadtrees 525 is generated by merging sets of planes 520a, 520b, . . . , 520n constructed from sets of images captured at different reference/vantage points across time (e.g., camera position or fields of view).

As shown in FIG. 5A, the device 100 or a component thereof (e.g., the image capture control module 1150 in FIG. 11) obtains a first set of images 504a (e.g., image data) relative to a first reference/vantage point 502a. In some embodiments, the device 100 or a component thereof (e.g., the point cloud synthesis module 1156 in FIG. 11) synthesizes a first three-dimensional (3d) point cloud 506a based on the first set of images 504a. In some embodiments, the device 100 a component thereof (e.g., the plane fitting module 1158 in FIG. 11) constructs a first set of planes 520a based on the first 3d point cloud 506a. For example, the device 100 constructs the first set of planes 520a by fitting planes to the first 3d point cloud 506a according to known algorithms or techniques in the art (e.g., least fitting squares, principal component analysis, simultaneous localization and mapping (SLAM), etc.).

Similarly, as shown in FIG. 5A, the device 100 or a component thereof (e.g., the image capture control module 1150 in FIG. 11) obtains a second set of images 504b relative to a second reference/vantage point 502b. In some embodiments, the device 100 or a component thereof (e.g., the point cloud synthesis module 1156 in FIG. 11) synthesizes a second 3d point cloud 506*b* based on the second set of images 504*b*. In some embodiments, the device 100 or a component thereof (e.g., the plane fitting module 1158 in FIG. 11) constructs a second set of planes 520*b* based on the second 3d point cloud 506*b*.

Similarly, as shown in FIG. 5A, the device 100 or a component thereof (e.g., the image capture control module 1150 in FIG. 11) obtains an n-th set of images 504*n* relative to an n-th reference/vantage point 502*n*. In some embodiments, the device 100 or a component thereof (e.g., the point cloud synthesis module 1156 in FIG. 11) synthesizes an n-th 3d point cloud 506*n* based on the n-th set of images 504*n*. In some embodiments, the device 100 a component thereof (e.g., the plane fitting module 1158 in FIG. 11) constructs an n-th set of planes 520*n* based on the n-th 3d point cloud 506*n*.

According to some embodiments, the device 100 or a component thereof (e.g., the correlation module 1162 in FIG. 11) correlates the first set of planes 520*a*, the second set of planes 520*b*, . . . , and the n-th set of planes 520*n* to generate a merged set of planes. In turn, in some embodiments, the device 100 or a component thereof (e.g., the quadtree generation module 1160 in FIG. 11) generate the set of quadtrees 525 based on the merged set of planes. For example, the device 100 generates the set of quadtrees 525 according to known algorithms or techniques in the art.

Figure 5B:
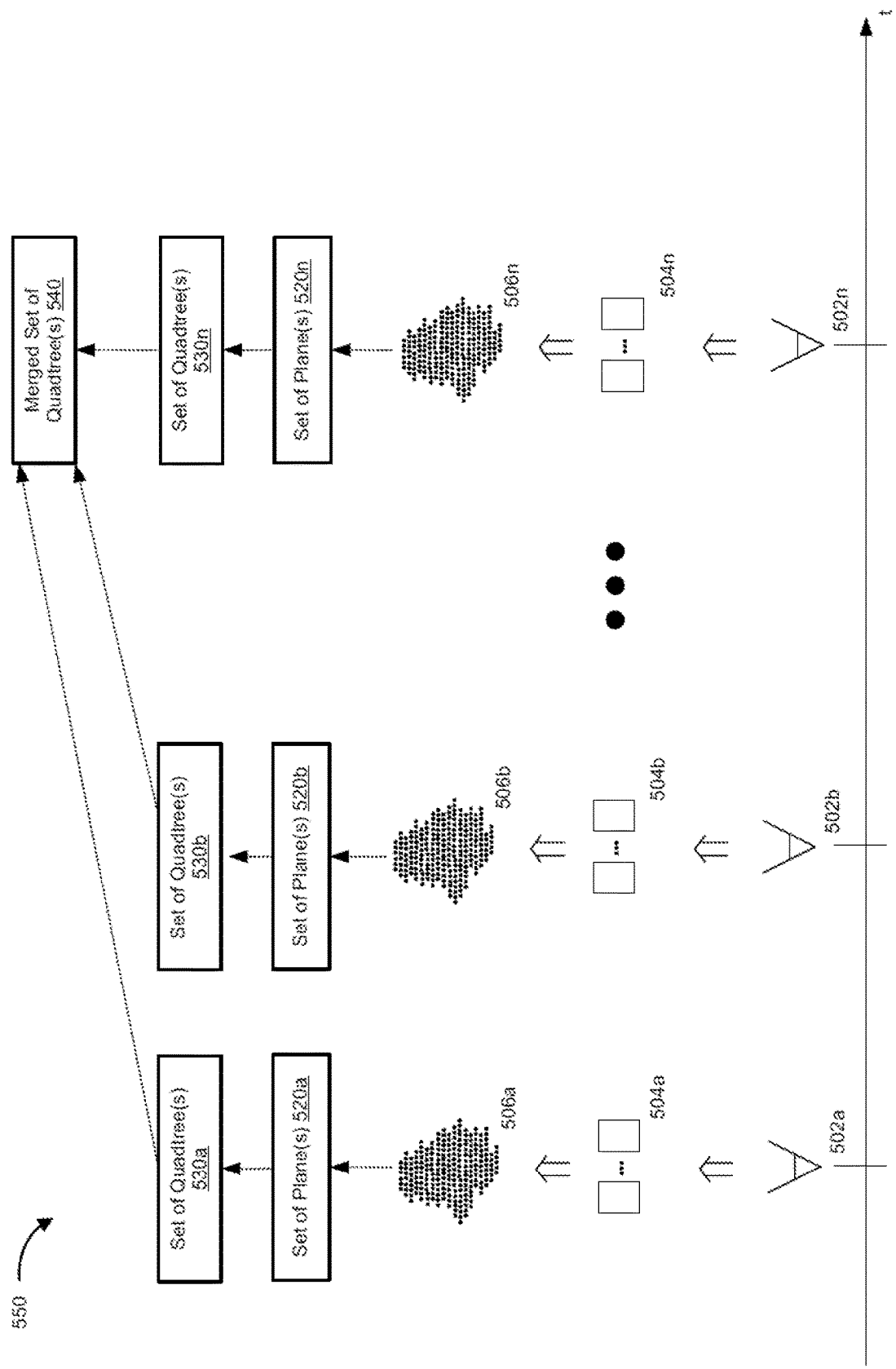

FIG. 5B illustrates an abstract block diagram associated with a process 550 for generating a set of quadtrees in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. For example, in some embodiments, in process 550 the merged set of quadtrees 540 is generated by merging sets of quadtrees 530*a*, 530*b*, . . . , 530*n* constructed from 3d point clouds associated with different reference/vantage points across time (e.g., camera position or fields of view).

As shown in FIG. 5B, the device 100 or a component thereof (e.g., the image capture control module 1150 in FIG. 11) obtains a first set of images 504*a* (e.g., image data) relative to a first reference/vantage point 502*a*. In some embodiments, the device 100 or a component thereof (e.g., the point cloud synthesis module 1156 in FIG. 11) synthesizes a first 3d point cloud 506*a* based on the first set of images 504*a*. In some embodiments, the device 100 a component thereof (e.g., the plane fitting module 1158 in FIG. 11) constructs a first set of planes 520*a* based on the first 3d point cloud 506*a* and/or the first set of images 504*a*. In some embodiments, the device 100 or a component thereof (e.g., the quadtree generation module 1160 in FIG. 11) generates a first set of quadtrees 530*a* based on the first set of planes 520*a* and/or the first 3d point cloud 506*a*. For example, the device 100 generates the first set of quadtrees 530*a* according to details described with reference to FIG. 10.

Similarly, as shown in FIG. 5B, the device 100 or a component thereof (e.g., the image capture control module 1150 in FIG. 11) obtains a second set of images 504*b* relative to a second reference/vantage point 502*b*. In some embodiments, the device 100 or a component thereof (e.g., the point cloud synthesis module 1156 in FIG. 11) synthesizes a second 3d point cloud 506*b* based on the second set of images 504*b*. In some embodiments, the device 100 a component thereof (e.g., the plane fitting module 1158 in FIG. 11) constructs a second set of planes 520*b* based on the second 3d point cloud 506*b* and/or the second set of images 504*b*. In some embodiments, the device 100 or a component thereof (e.g., the quadtree generation module 1160 in FIG. 11) generates a second set of quadtrees 530*b* based on the second set of planes 520*b* and/or the second 3d point cloud 506*b*.

Similarly, as shown in FIG. 5B, the device 100 or a component thereof (e.g., the image capture control module 1150 in FIG. 11) obtains an n-th set of images 504*n* relative to an n-th reference/vantage point 502*n*. In some embodiments, the device 100 or a component thereof (e.g., the point cloud synthesis module 1156 in FIG. 11) synthesizes an n-th 3d point cloud 506*n* based on the n-th set of images 504*n*. In some embodiments, the device 100 a component thereof (e.g., the plane fitting module 1158 in FIG. 11) constructs an n-th set of planes 520*n* based on the n-th 3d point cloud 506*n* and/or the n-th set of images 504*n*. In some embodiments, the device 100 or a component thereof (e.g., the quadtree generation module 1160 in FIG. 11) generates an n-th set of quadtrees 530*n* based on the n-th set of planes 520*n* and/or the n-th 3d point cloud 506*n*.

According to some embodiments, the device 100 or a component thereof (e.g., the correlation module 1162 in FIG. 11) correlates the first set of quadtrees 530*a*, the second set of quadtrees 530*b*, . . . , and the n-th set of quadtrees 530*n* to obtain a merged set of quadtrees 540. For example, the device 100 generates the merged set of quadtrees 540 according to details described with reference to FIG. 10.

FIGS. 6A-6G illustrate example user interfaces for detecting virtual substrates in accordance with some embodiments. The user interfaces in these figures are used to illustrate the processes described below, including the processes in FIGS. 8-10. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 6A:
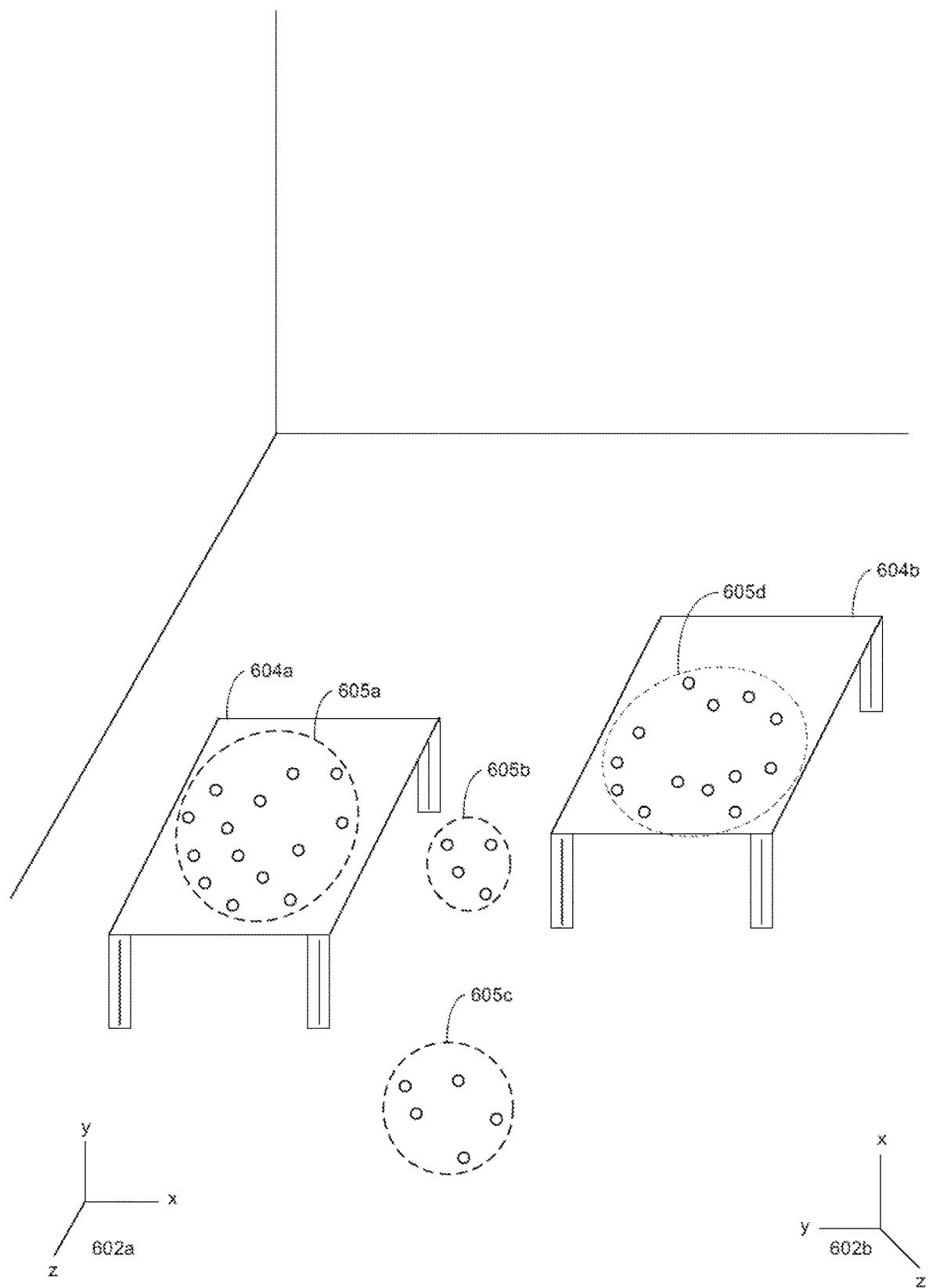
FIGS. 6A-6G illustrate example user interfaces for detecting virtual substrates in accordance with some embodiments.
Figure 6B:
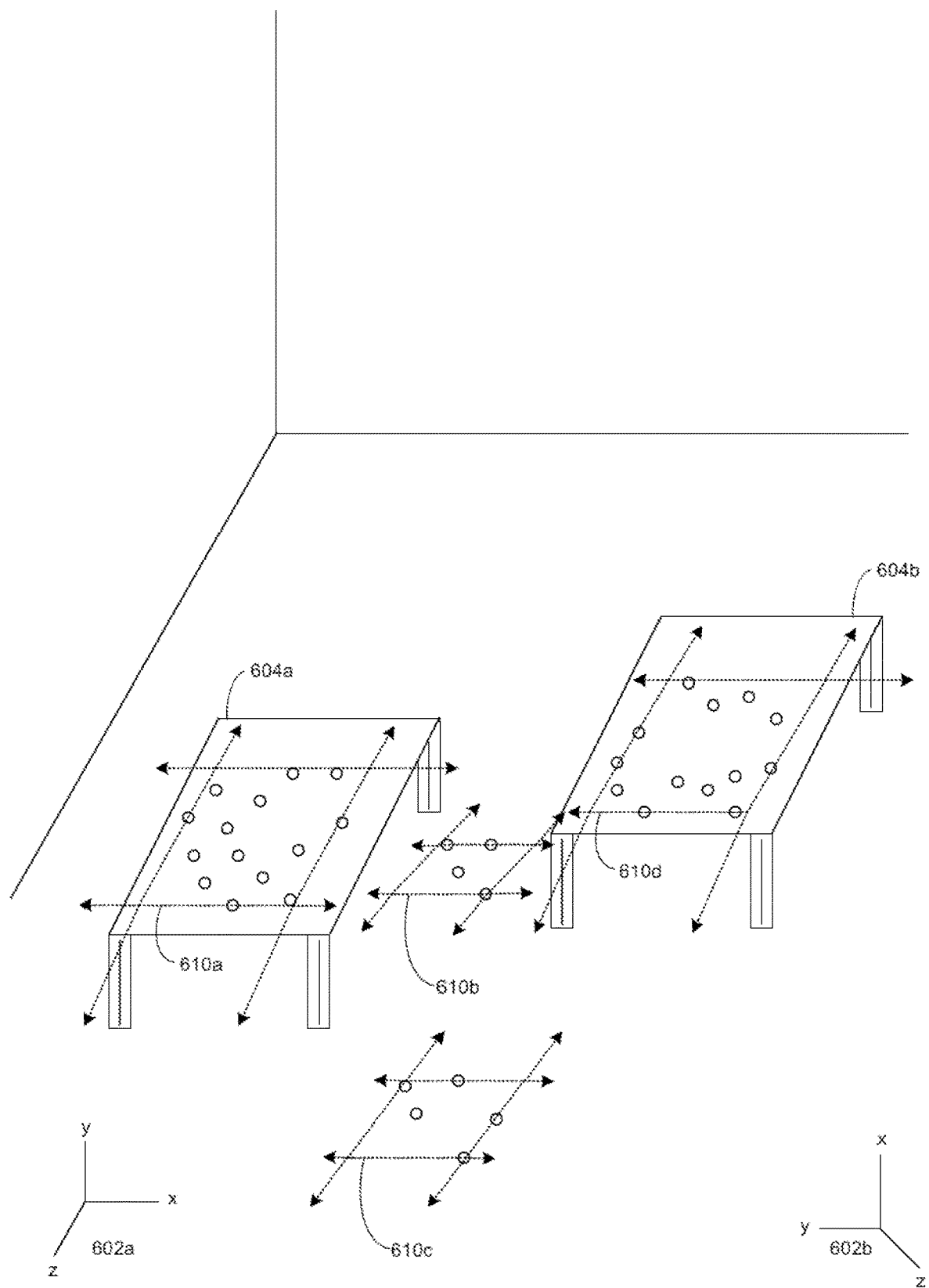
Figure 6C:
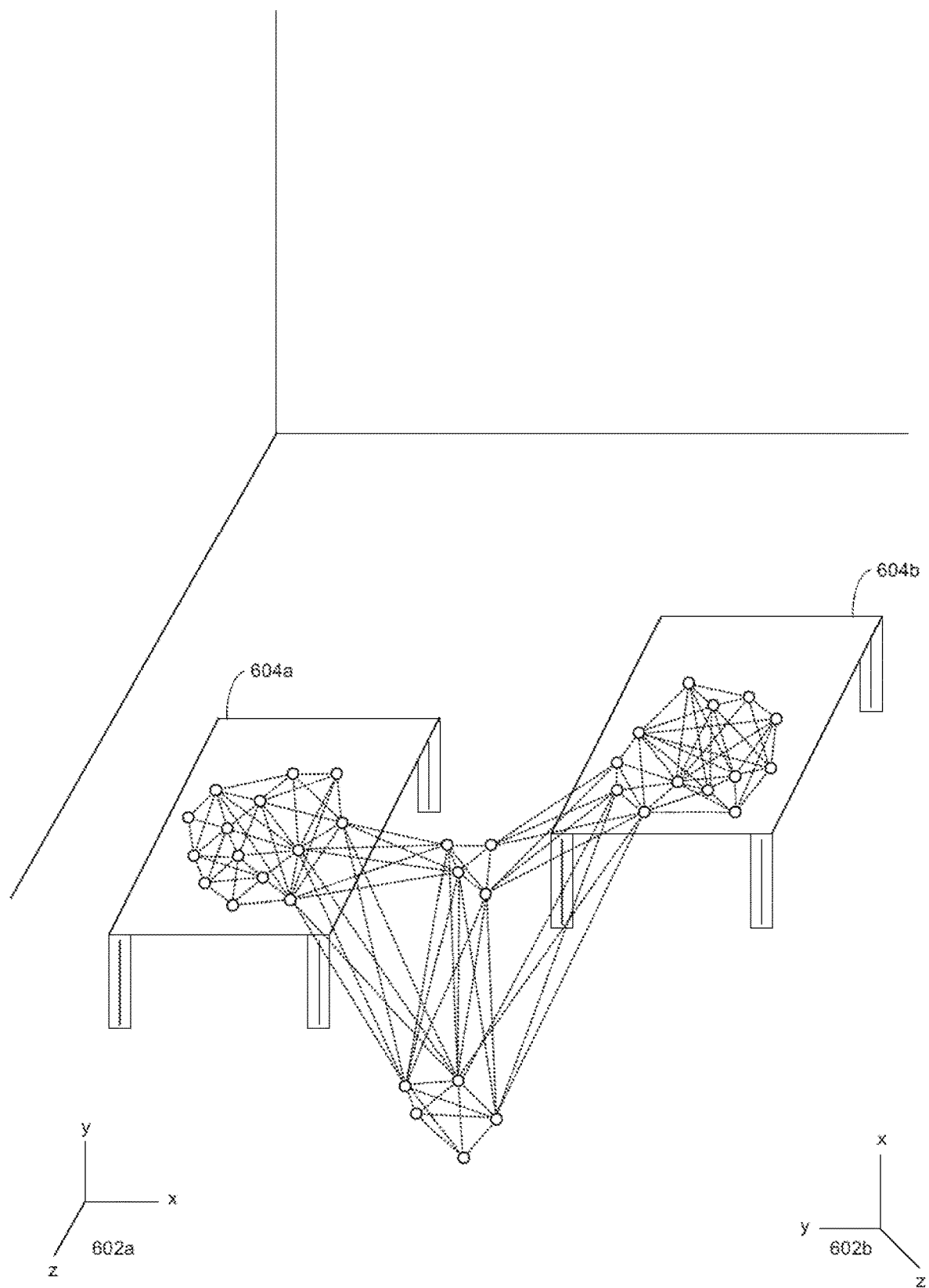
Figure 6D:
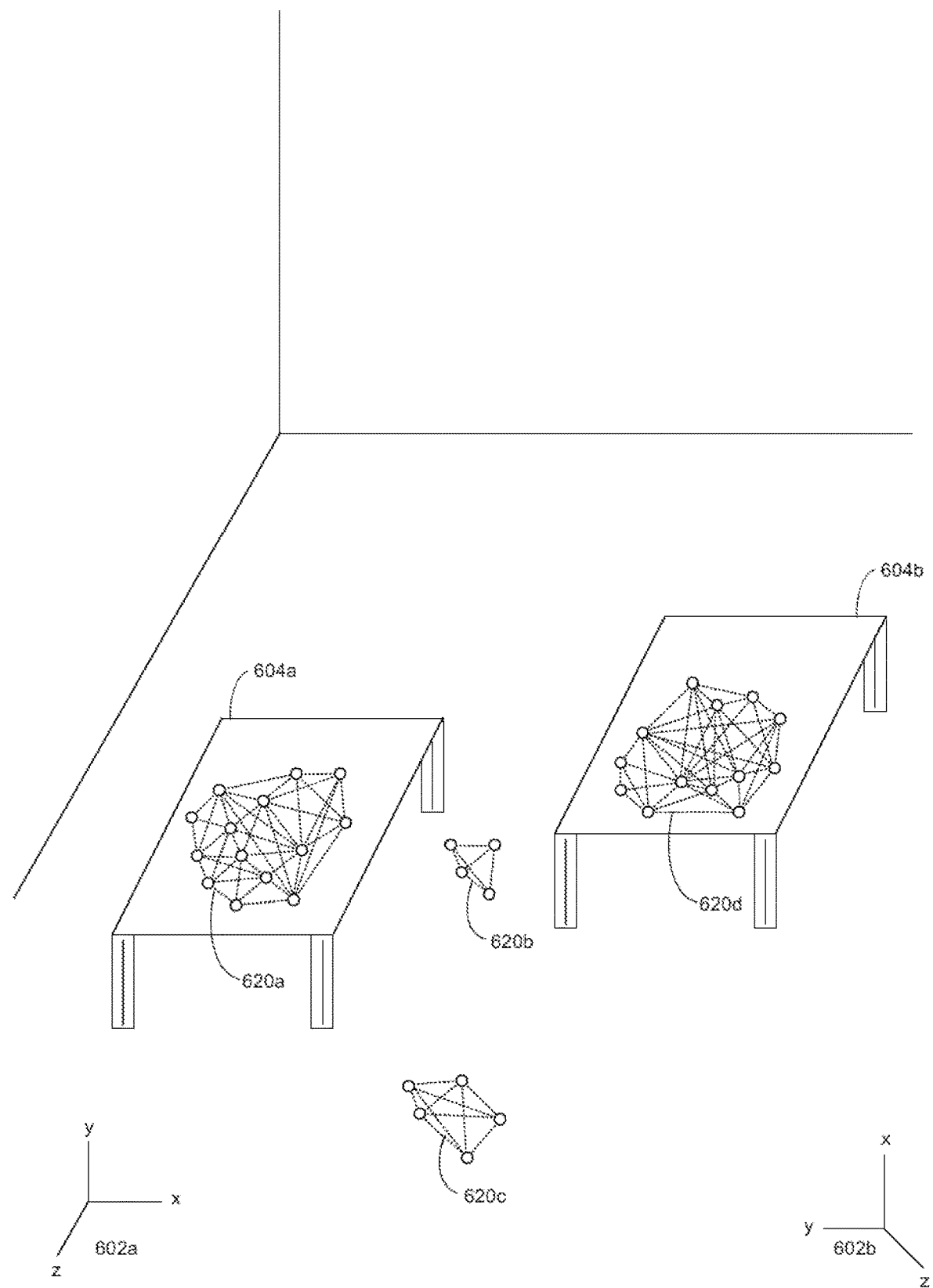
Figure 6E:
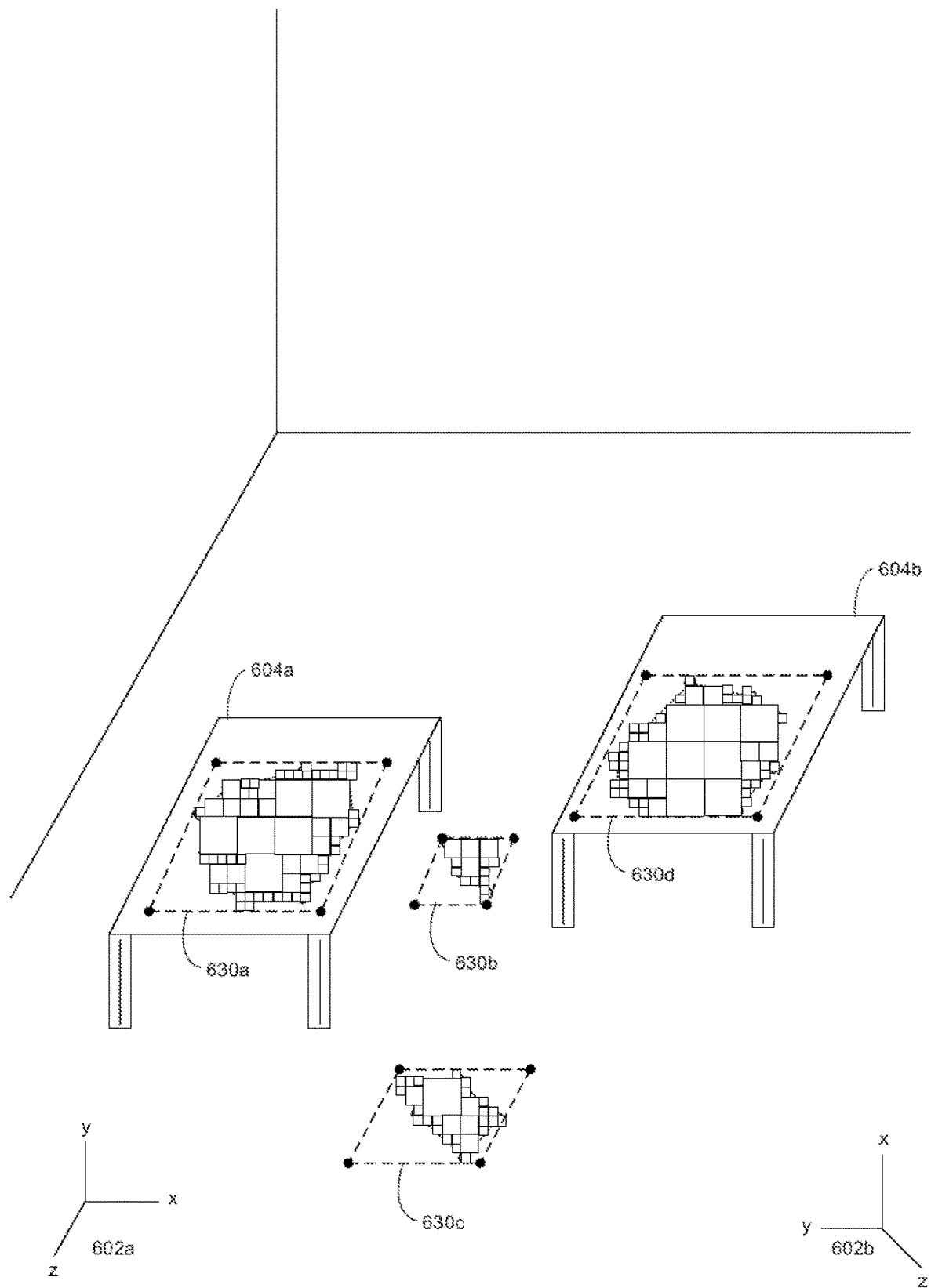
Figure 6F:
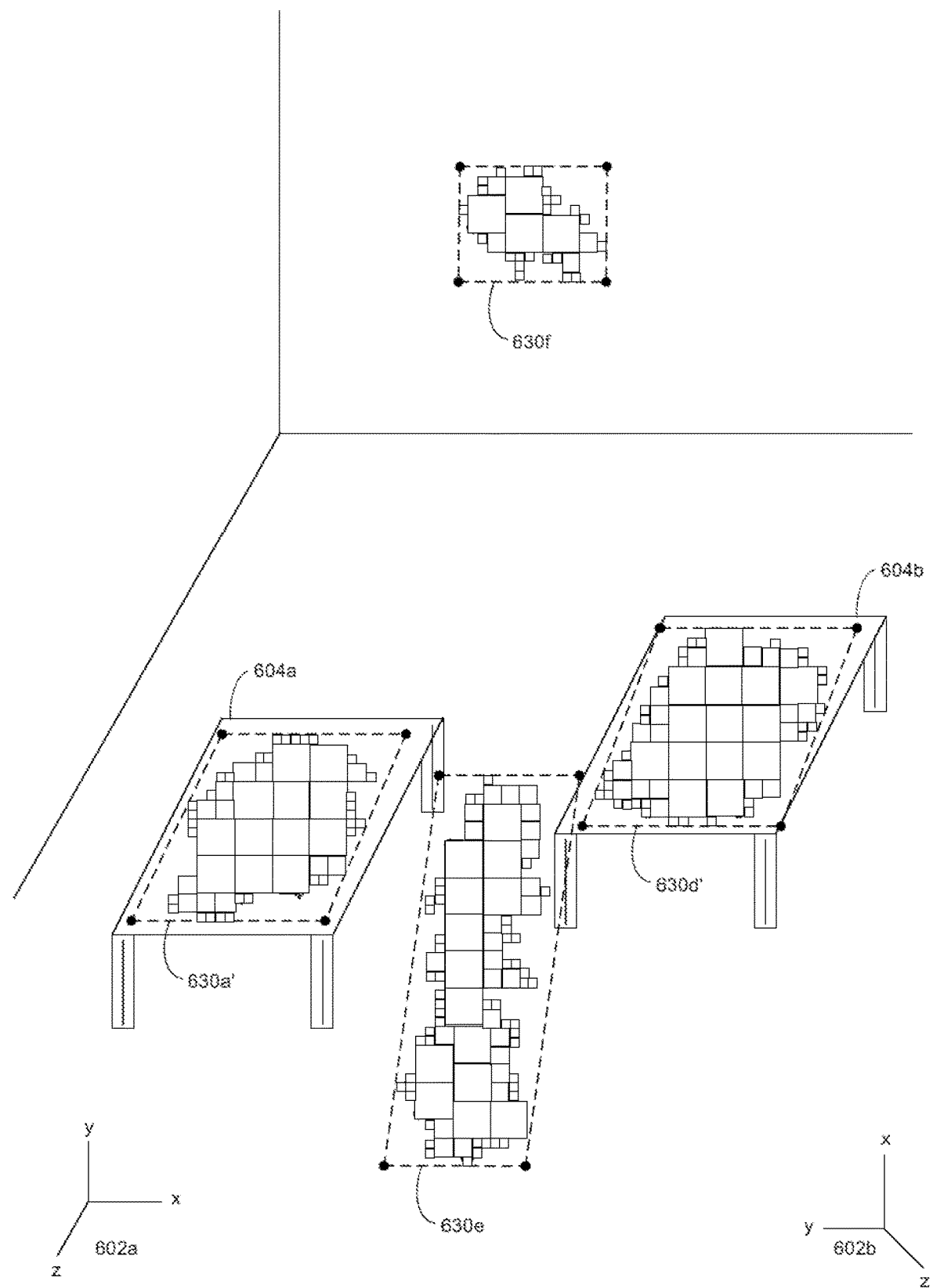
Figure 6G:
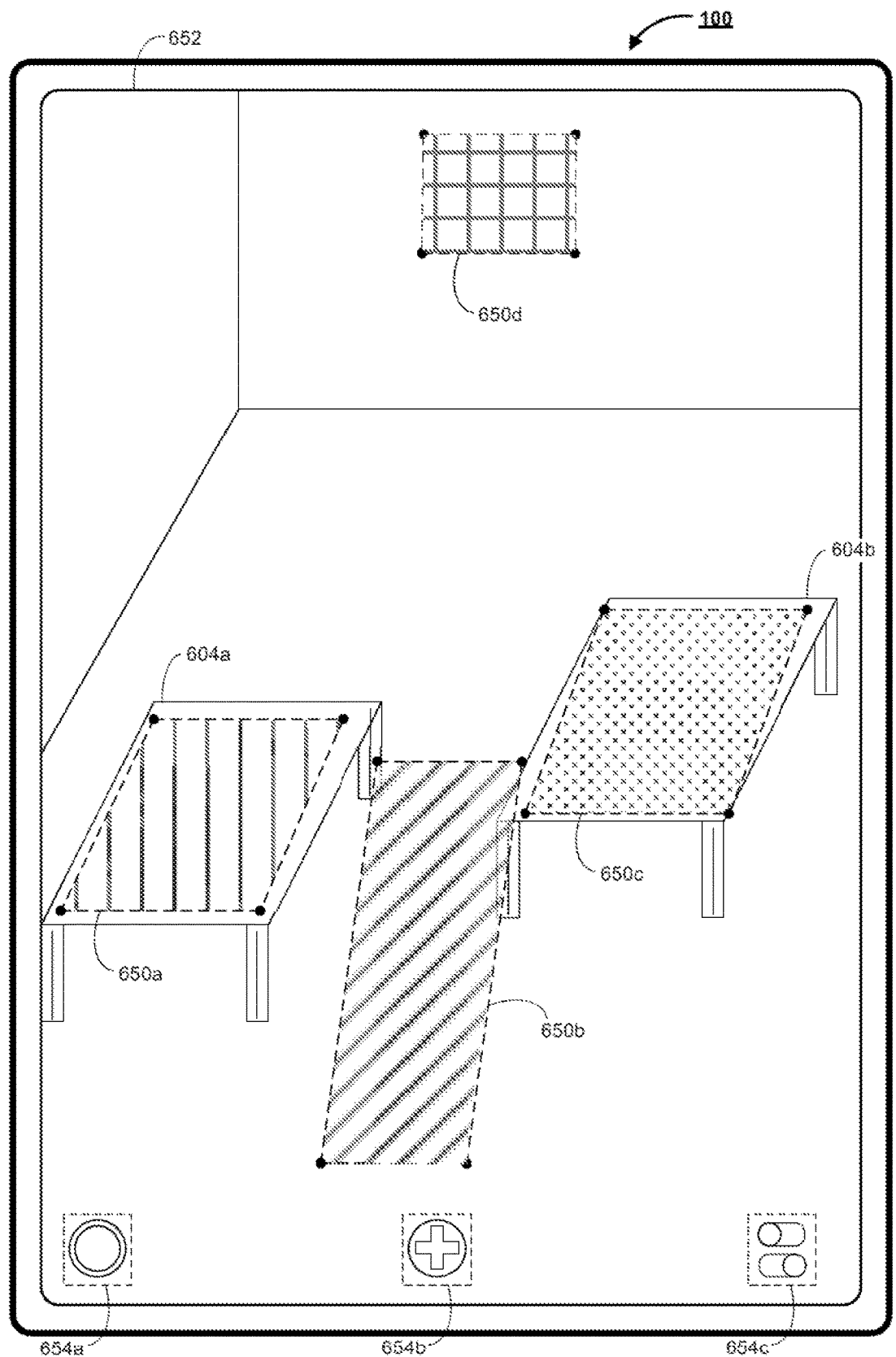

In some embodiments, the device 100 displays the steps performed in FIGS. 6A-6H within a user interface similar to the media capture/interaction interface 652 in FIG. 6G. In some embodiments, the device 100 performs but does not display the steps in FIGS. 6A-6H and, instead, displays the resulting planes 650*a*, 650*b*, 650*c*, and 650*d* within the media capture/interaction interface 652 in FIG. 6G.

As shown in FIG. 6A, the device 100 detects a plurality of clusters of points 605*a*, 605*b*, 605*c*, and 605*d* within a scene. For example, the cluster of points 605*a* corresponds to a first table 604*a* within the scene. For example, the cluster of points 605*b* corresponds to a portion of the floor within the scene. For example, the cluster of points 605*c* corresponds to another portion of the floor within the scene. For example, the cluster of points 605*d* corresponds to a second table 604*b* within the scene. According to some embodiments, the device 100 obtains a plurality of images of the scene and synthesizes a three-dimensional (3d) point cloud of points identified in the scene that includes the clusters of points 605*a*, 605*b*, 605*c*, and 605*d*. In some embodiments, the device 100 or a component thereof (e.g., the coordinate transformation module 1154 in FIG. 11) tracks the world coordinates 602*a* and the device coordinates 602*b* in order to perform transformations between an image space associated with the device coordinates 602*b* and a 3d space (e.g., the room or scene in FIGS. 6A-6G) associated with the world coordinates 602*a*.

As shown in FIG. 6B, in a 3d coordinate space associated with the 3d point cloud, the device 100 constructs (e.g., identifies) a plurality of planes 610a, 610b, 610c, and 610d (e.g., infinite planes) based on the clusters of points 605a, 605b, 605c, and 605d in FIG. 6A. In some embodiments, the device 100 constructs the plurality of planes 610a, 610b, 610c, and 610d by fitting infinite planes to the clusters of points 605a, 605b, 605c, and 605d in the 3d point cloud according to known algorithms or techniques in the art (e.g., least fitting squares, principal component analysis, simultaneous localization and mapping (SLAM), etc.).

As shown in FIG. 6C, in a two-dimensional (2d) coordinate space associated with the plurality of images used to synthesize the 3d point cloud, the device 100 triangulates points within the clusters of points 605a, 605b, 605c, and 605d in FIG. 6A.

As shown in FIG. 6D, in the 2d coordinate space, the device 100 removes triangles having points that are not associated with a same plane based on the plurality of planes 610a, 610b, 610c, and 610d in FIG. 6B to obtain a plurality of constrained triangulated regions 620a, 620b, 620c, and 620d.

As shown in FIG. 6E, the device 100 projects the plurality of constrained triangulated regions 620a, 620b, 620c, and 620d back into the 3d coordinate space and quadratizes the plurality of constrained triangulated regions 620a, 620b, 620c, and 620d to obtain quadtrees 630a, 630b, 630c, and 630d. In FIG. 6E, the quadtrees 630a, 630b, 630c, and 630d are enclosed by bounding boxes based on the extent thereof.

As shown in FIG. 6F, due to the detection of additional points, the quadtree 630a associated with the first table 604a has enlarged in size to state 630a', the quadtrees 630b and 630c associated with the floor have merged into quadtree 630e, the quadtree 630d associated with the second table 604b has enlarged in size to state 630d', and a new quadtree 630f associated with the wall of the room within the scene has been detected.

As shown in FIG. 4G, the device 100 displays a media capture/interaction interface 652 provided to detect planes and places augmented reality and/or virtual reality (AR/VR) objects thereon. According to some embodiment, the media capture/interaction interface 652 corresponds to a media capture preview of a scene with objects in a field of view of an image sensor of the device that changes as the field of view of the image sensor changes. For example, in FIG. 6G, the media capture preview includes the scene shown in FIG. 6A-6F with the tables 604a and 604b. According to some embodiments, the media capture/interaction interface 652 in FIG. 6G is similar to or adapted from the media capture/interaction interface 402 in FIGS. 4A-4M.

In FIG. 6G, the media capture/interaction interface 652 includes: a snapshot affordance 654a provided to capture an image in response to selection thereof (e.g., with a contact or selection gesture); an AR/VR object menu affordance 654b provided to display an object selection interface in response to selection thereof (e.g., with a contact or selection gesture); and an options affordance 654c provided to display an options and/or settings menu in response to selection thereof (e.g., with a contact or selection gesture). In FIG. 6G, the user interface 602 also includes plane extents 650a, 650b, 650c, and 650d that correspond to the bounding boxes of the quadtrees 630a', 630d', 630e, and 630f in FIG. 6F, respectively.

As shown in FIG. 6G, each of the plane extents 650a, 650b, 650c, and 650d is displayed with a unique appearance, pattern, fill, and/or the like. According to some embodiments, each of the plane extents 650a, 650b, 650c, and 650d corresponds to a virtual substrate upon which an AR/VR object may be placed (e.g., as shown in FIGS. 4F-4G) and manipulated (e.g., as shown in FIGS. 4G-4K). In some embodiments, each of the plane extents 650a, 650b, 650c, and 650d provides a visual cue that a plane has been detected within the scene. In some embodiments, each of the plane extents 650a, 650b, 650c, and 650d provides a visual indication of a portion of the extent of the associated detected quadtrees.

FIG. 7 is a flowchart representation of a method 700 of detecting a virtual substrate and placing objects thereon in accordance with some embodiments. In some embodiments (and as detailed below as an example), the method 700 is performed by an electronic device (or a portion thereof), such as the electronic device 100 in FIG. 1 or the device 300 in FIG. 3, that includes one or more processors, non-transitory memory, an image sensor or camera assembly, a display, and one or more inputs devices. For example, the display and the one or more input devices are combined into a touch screen display. In this example, the electronic device corresponds to a smartphone or a tablet. In another example, the display and the one or more input devices are separate. In this example, the electronic device corresponds to a laptop or desktop computer. For example, the electronic device corresponds to a wear computing device, smartphone, tablet, laptop computer, desktop computer, kiosk, set-top box (STB), over-the-top (OTT) box, gaming console, and/or the like.

In some embodiments, the method 700 is performed by processing logic, including hardware, firmware, software, or a suitable combination thereof. In some embodiments, the method 700 is performed by one or more processors executing code, programs, or instructions stored in a non-transitory computer-readable storage medium (e.g., a non-transitory memory). Some operations in method 700 are, optionally, combined and/or the order of some operations is, optionally, changed. Briefly, the method 700 includes: changing a reticle element from a first appearance state to a second appearance state in response to detecting a plane within a scene; placing an augmented reality/virtual reality (AR/VR) object in the scene relative to the detected plane; and modifying/manipulating the AR/VR object based on a user input.

The method 700 begins, at block 702, with the electronic device displaying a reticle element overlaid on a media capture preview in a first appearance state. For example, in FIG. 4B, the device 100 displays the media capture/interaction interface 402 that includes a media capture preview of a scene that corresponds to a room with a table 415 and two walls therein. Continuing with this example, in FIG. 4B, the media capture/interaction interface 402 also includes a reticle element displayed in a first appearance state 410. In some embodiments, in the first appearance state 410, the reticle element corresponds to a transparent rectangle with opaque corners but no edges. In some embodiments, the reticle element corresponds to a rectangle, an ellipse, a polygon, a magnifying glass, a crosshair, or the like.

The method 700 continues, at block 704, with the electronic device obtaining scene data. According to some embodiments, the device 100 or a component thereof (e.g., the image capture control module 1150 in FIG. 11) obtains scene data (e.g., image data) by capturing two or more images of the scene from a first reference/vantage point (e.g., a camera position or field of view) with an image sensor or camera assembly.

The method 700 continues, at block 706, with the electronic device detecting a plane based on the scene data. For example, the device detects a planar surface within the scene data (e.g., a floor, wall, table top, etc.). According to some embodiments, the device 100 or a component thereof (e.g., the plane fitting module 1158 in FIG. 11) detects at least one plane by processing the scene data. For example, with reference to FIG. 4B, the device 100 detects a plane corresponding to the top of the table 415. In some embodiments, the entirety of the plane is within the reticle element. In some embodiments, at least a portion the plane is within the reticle element. In some embodiments, the plane is larger than the extent of the reticle element. In some embodiments, the plane is smaller than the extent of the reticle element. In some embodiments, in response to detecting two or more planes, the device displays multiple reticle elements in the second appearance state at locations proximate to the two or more detected planes.

The method 700 continues, at block 708, with the electronic device displaying the reticle element in a second appearance state indicating detection of the plane. For example, in FIG. 4C, the device 100 changes the reticle element from the first appearance state 410 to the second appearance state 410' in response to detecting the plane associated with the top of the table 415 proximate to the reticle element. In some embodiments, in the second appearance state, the reticle element is displayed as a transparent rectangle with opaque or flashing edges. In some embodiments, in the second appearance state, the reticle element is displayed as a partially transparent rectangle with opaque or flashing edges. In some embodiments, while displayed in the second appearance state, the reticle element provides a visual cue that a plane has been detected that can be used as a virtual substrate for AR/VR objects. In some embodiments, while displayed in the second appearance state, the reticle element also provides a visual cue of the bounds of the detected plane that can be used as a virtual substrate for AR/VR objects.

In some embodiments, the device transitions the reticle element from the first appearance state to the second appearance state in accordance with a determination that the detected plane is proximate to the reticle element while displayed in the first appearance state. According to some embodiments, the detected plane is proximate to the reticle element when the detected plane is projected onto an image space associated with the scene data (e.g., a two-dimensional space associated with the device coordinates) and at least a predefined number of pixels overlap between the reticle element and the detected plane. According to some embodiments, the detected plane is proximate to the reticle element when reticle element is projected onto a real word space associated with the scene (e.g., a three-dimensional space associated with the world coordinates) and at least a predefined number of pixels overlap between the reticle element and the detected plane.

In some embodiments, the device transitions the reticle element from the first appearance state to the second appearance state in accordance with a determination that the detected plane is within a threshold distance of the reticle element while displayed in the first appearance state. According to some embodiments, the detected plane is within a threshold distance of the reticle element when the detected plane is within a predetermined distance of the device.

In some embodiments, as represented by block 712, the device aligns the reticle element to the orientation of the detected plane. For example, in FIG. 4D, the device 100 displays the reticle element in a third appearance state 410" by spinning and/or aligning the reticle element to the orientation of the detected plane associated with the table 415. In some embodiments, the reticle element aligns with the yaw, pitch, and/or roll of the detected plane.

In some embodiments, as represented by block 714, the device enlarges the reticle element. For example, in FIG. 4E, the device 100 displays the reticle element in a fourth appearance state 410''' by enlarging the area of the reticle element in response to detecting additional points associated with the plane indicating that its extent is greater than previously detected. In some embodiments, the reticle element expands to the detected size of the plane. In some embodiments, the reticle element shrinks to the detected size of the plane. In some embodiments, while the reticle element is displayed in the second appearance state, the size of the reticle element dynamically changes as the size of the detected plane changes based on detection of additional points.

For example, the device detects a user input that corresponds to changing one or more dimensions of the reticle element such as a pinch gesture, a de-pinch gesture, a tap-and-drag gesture, or the like. For example, FIGS. 4L-4M show a sequence in which a dimension of the reticle element (e.g., height of the reticle element is moved towards the front edge 444 of the table 415) is changed in response to detecting a tap-and-drag gesture on the reticle element in FIG. 4L. In some embodiments, the user input modifies the size of the reticle element within the bounds of the detected plane. As such, in some embodiments, the user input does not resize the reticle element beyond the extent of the detected plane.

The method 700 continues, at block 716, with the electronic device detecting a first user input placing an augmented reality and/or virtual reality (AR/VR) object within the scene. For example, in FIG. 4F, the device 100 detects a contact 414 (e.g., a tap or selection gesture) at a location that corresponds to the user-selectable AR/VR object 476*f* (e.g., the cuboid object) within the object selection interface 472. In some embodiments, the device displays the object selection interface (e.g., a pop-over or pull-down menu/panel) in response to selecting a predefined affordance (e.g., the AR/VR object menu affordance 404*b* in.

The method 700 continues, at block 718, with the electronic device displaying the AR/VR object within the scene relative to the detected plane. For example, in FIG. 4G, the device 100 displays a cuboid AR/VR object 420 within the scene relative to the detected plane in response to detecting the selection of the user-selectable AR/VR object 476*f* in FIG. 4F. In some embodiments, the AR/VR object is displayed on the geometric center (e.g., the centroid) of the detected plane. In some embodiments, after placing the AR/VR object within the scene relative to the detected plane, the device 100 removes the reticle element. In some embodiments, the device 100 removes the reticle element to reduce occlusion and clutter when displaying the AR/VR object. In some embodiments, the device applies a rotation (e.g., yaw, pitch, and/or roll) to the AR/VR object based on an orientation of the detected plane.

The method 700 continues, at block 720, with the electronic device detecting a second user input placing interacting with the AR/VR object. As one example, in FIG. 4G, the device 100 detects a reverse pinch gesture with the contacts 416*a* and 416*b* on the cuboid AR/VR object 420. As another example, in FIG. 4H, the device 100 detects a tap-and-drag gesture with the contact 418 on the cuboid AR/VR object 420. As yet another example, in FIG. 4I, the device 100 detects a two-finger counter-clockwise spin gesture with the contacts 422*a* and 422*b* on the cuboid AR/VR object 420. As yet another example, in FIG. 4I, the device 100 detects a one-finger tap gesture with the contact 424 on the cuboid AR/VR object 420.

The method 700 continues, at block 722, with the electronic device modifying the AR/VR object based on one or more characteristics of the second user input. As one example, FIGS. 4H-4I show a sequence in which the cuboid AR/VR object 420 moves closer to the front edge 423 of the table 415 in response to detecting a tap-and-drag gesture on the cuboid AR/VR object 420 in FIG. 4H. In some embodiments, the one or more characteristics of the second user input correspond to the input type (e.g., a voice command, a pinch gesture, a reverse pinch gesture, a tap-and-frag gesture, a swipe gesture, a one-finger tap gesture, a two-finger tap gesture, a one-finger double tap gesture, a two-finger double tap gesture, etc.), input direction, input magnitude, input speed, and/or the like.

In some embodiments, the one or more characteristics correspond to an input type. For example, if the third user input corresponds to a tap-and-drag gesture, the device modifies the location of the AR/VR object relative to the detected plane. In some embodiments, if the tap-and-drag gesture, moves the AR/VR object outside of the detected plane, the device displays the AR/VR object on a next closest plane (e.g., the floor plane). In some embodiments, if the tap-and-drag gesture, moves the AR/VR object outside of the detected plane, the device maintains displays of the AR/VR object on an edge of the detected plane. In another example, if the third user input corresponds to a pinch gesture, the device modifies the size of the AR/VR object. In another example, if the third user input corresponds to a predefined gesture, the device displays a predefined animation with the AR/VR object or performs a predefined operation on the AR/VR object. In some embodiments, the device displays a predefined animation with the AR/VR object or performs a predefined operation on the AR/VR object based on the distance of the device relative to the AR/VR object. In some embodiments, when the location of the device changes relative to the AR/VR object, the device maintains perspective of the AR/VR object (e.g., increase/decrease size, show a different angle of the AR/VR object, etc.).

In some embodiments, as represented by block 724, the device spins the AR/VR object. For example, FIGS. 4I-4J show a sequence in which the orientation of the cuboid AR/VR object 420 is changed in response to detecting the counter-clockwise spin gesture on the cuboid AR/VR object 420 in FIG. 4I.

In some embodiments, as represented by block 726, the device resizes the AR/VR object. For example, FIGS. 4G-4H show a sequence in which the size of the cuboid AR/VR object 420 increases in response to detecting a reverse pinch gesture on the cuboid AR/VR object 420 in FIG. 4G.

In some embodiments, as represented by block 728, the device triggers a behavior associated with the AR/VR object. In some embodiments, the behavior corresponds to a predefined animation or operation performed on the AR/VR object such as petting an AR/VR animal to cause it to bark or meow, tapping an AR/VR car to cause it to honk or rev its engine, tapping an AR/VR cube like a hammer to cause it to split in half, tapping an AR/VR volcano to cause it to erupt, and/or the like. For example, FIGS. 4J-4K show a sequence in which the cuboid AR/VR object 420 is split into cuboid AR/VR objects 430a and 430b in response to detecting a predefined interaction gesture on the cuboid AR/VR object 420 in FIG. 4J.

FIG. 8 is a flowchart representation of a method 800 of generating a merged set of quadtrees for use as a virtual substrate in accordance with some embodiments. In some embodiments (and as detailed below as an example), the method 800 is performed by an electronic device (or a portion thereof), such as the electronic device 100 in FIG. 1 or the device 300 in FIG. 3, that includes one or more processors and non-transitory memory. In some embodiments, the device optionally includes a display, an image sensor or camera assembly, and one or more input devices (e.g., a touch screen display, touchpad, mouse, keyboard, physical buttons, microphone, etc.). For example, the display and the one or more input devices are combined into a touch screen display. In this example, the electronic device corresponds to a smartphone or a tablet. In another example, the display and the one or more input devices are separate. In this example, the electronic device corresponds to a laptop or desktop computer. For example, the electronic device corresponds to a wear computing device, smartphone, tablet, laptop computer, desktop computer, kiosk, set-top box (STB), over-the-top (OTT) box, gaming console, and/or the like.

In some embodiments, the method 800 is performed by processing logic, including hardware, firmware, software, or a suitable combination thereof. In some embodiments, the method 800 is performed by one or more processors executing code, programs, or instructions stored in a non-transitory computer-readable storage medium (e.g., a non-transitory memory). Some operations in method 800 are, optionally, combined and/or the order of some operations is, optionally, changed. Briefly, the method 800 includes: obtaining a plurality of sets of images for different reference/vantage points; synthesizing a 3d point cloud for each of the plurality of sets of images; constructing planes using the respective 3d point clouds; and generating a set of quadtrees characterizing a merged set of planes across the 3d point clouds.

The method 800 begins, at block 802, with the electronic device obtaining a plurality of sets of images for different reference/vantage points. For example, as shown in FIGS. 5A-5B, the device 100 or a component thereof (e.g., the image capture control module 1150 in FIG. 11) obtains sets of images 504a, 504b, . . . , 504n (e.g., image data) for the reference/vantage points 502a, 502b, . . . , 502n, respectively. In some embodiments, each of the sets of images includes two or more images. In some embodiments, each of the sets of images corresponds to different reference/vantage points (e.g., different camera positions or fields of view).

The method 800 continues, at block 804, with the electronic device synthesizing a three-dimensional (3d) point cloud for each of the plurality of sets of images. For example, as shown in FIGS. 5A-5B, the device 100 or a component thereof (e.g., the point cloud synthesis module 1156 in FIG. 11) synthesizes three-dimensional (3d) point clouds 506a, 506b, . . . , 506n based on the sets of images 504a, 504b, . . . , 504n for the reference/vantage points 502a, 502b, . . . , 502n, respectively. In some embodiments, the device 100 synthesizes the 3d point clouds according to known algorithms or techniques in the art by identifying a set of points for each sets of images and locating those points in a 3d space.

The method 800 continues, at block 806, with the electronic device constructing planes using the respective 3d point clouds. For example, as shown in FIGS. 5A-5B, the device 100 or a component thereof (e.g., the plane fitting module 1158 in FIG. 11) constructs a set of planes 520a, 520b, . . . , 520n based on the 3d point clouds 506a, 506b, . . . , 506n, respectively. In some embodiments, the device 100 constructs (e.g., fits) the planes to the 3d point clouds according to known algorithms or techniques in the art (e.g., least fitting squares, principal component analysis, simultaneous localization and mapping (SLAM), etc.).

The method 800 continues, at block 808, with the electronic device generating a set of quadtrees characterizing a merged set of planes across the 3d point clouds. For example, as shown in FIG. 5A, the device 100 or a component thereof (e.g., the quadtree generation module 1160 in FIG. 11) generates a set of quadtrees 525 characterizing a merged set of planes across the 3d point clouds 506a, 506b, . . . , 506n over time. For example, as shown in FIG. 5B, the device 100 or a component thereof (e.g., the quadtree generation module 1160 in FIG. 11) generates a merged set of quadtrees 540 characterizing a merged set of planes across the 3d point clouds 506a, 506b, . . . , 506n over time. In some embodiments, the device 100 generates the set of quadtrees according to known algorithms or techniques in the art. According to some embodiments, as will be appreciated by one of ordinary skill in the art the method 800 is also applicable to generating octrees characterizing the scene.

In some embodiments, as represented by block 810, the device generates a set of planes for each of the 3d points clouds and generates the merged set of planes by correlating the sets of planes. In some embodiments, as represented by block 812, the device generates the set of quadtrees based on the merged set of planes. For example, as shown in FIG. 5A, the device 100 or a component thereof (e.g., the correlation module 1162 in FIG. 11) correlates the first set of planes 520a, the second set of planes 520b, . . . , and the n-th set of planes 520n to generate a merged set of planes. In turn, continuing with the example in FIG. 5A, the device 100 or a component thereof (e.g., the quadtree generation module 1160 in FIG. 11) generates the set of quadtrees 525 based on the merged set of planes.

In some embodiments, as represented by block 814, the device generates an intermediate set of quadtrees for each of the 3d point clouds based on associated planes. In some embodiments, as represented by block 816, the device generates the set of quadtrees by correlating the intermediate sets of quadtrees. For example, as shown in FIG. 5B, the device 100 or a component thereof (e.g., the quadtree generation module 1160 in FIG. 11) generates sets of quadtrees 530a, 530b, . . . , 530n based on the sets of planes 520a, 520n, . . . , 520n and/or the 3d point clouds 506a, 506b, . . . , 506n, respectively. In turn, continuing with the example in FIG. 5B, the device 100 or a component thereof (e.g., the correlation module 1162 in FIG. 11) correlates the sets of quadtrees 530a, 530b, . . . , 530n to generate a merged set of quadtrees 540.

FIG. 9 is a flowchart representation of a method 900 of generating a set of quadtrees for use as a virtual substrate in accordance with some embodiments. In some embodiments (and as detailed below as an example), the method 900 is performed by an electronic device (or a portion thereof), such as the electronic device 100 in FIG. 1 or the device 300 in FIG. 3, that includes one or more processors, non-transitory memory, an optional image sensor or camera assembly, an optional display, and one or more optional inputs devices. For example, the electronic device corresponds to a wear computing device, smartphone, tablet, laptop computer, desktop computer, kiosk, set-top box (STB), over-the-top (OTT) box, gaming console, and/or the like.

In some embodiments, the method 900 is performed by processing logic, including hardware, firmware, software, or a suitable combination thereof. In some embodiments, the method 900 is performed by one or more processors executing code, programs, or instructions stored in a non-transitory computer-readable storage medium (e.g., a non-transitory memory). Some operations in method 900 are, optionally, combined and/or the order of some operations is, optionally, changed. Briefly, the method 900 includes: generating a plurality of sets of planes for different reference/vantage points; correlating the sets of planes to obtain a merged set of planes over time; and generating a set of quadtrees based on the merged set of planes.

The method 900 begins, at block 902, with the electronic device obtaining a three-dimensional (3d) point cloud based on a set of images for a reference point X (e.g., a time period or camera position). As one example, in FIG. 5A, the device 100 or a component thereof (e.g., the point cloud synthesis module 1156 in FIG. 11) synthesizes an n-th 3d point cloud 506n based on the n-th set of images 504n relative to an n-th reference/vantage point 502n (e.g., the reference point X). For example, the device 100 synthesizes the n-th 3d point cloud 506n by identifying points within the n-th set of images 504n and locating the points relative to world coordinates by transforming the location of the points in an image space associated with the device coordinates to world coordinates according to known algorithms or techniques in the art.

The method 900 continues, at block 904, with the electronic device fitting planes to the 3d point cloud for the reference point X. As one example, in FIG. 5A, the device 100 a component thereof (e.g., the plane fitting module 1158 in FIG. 11) constructs an n-th set of planes 520n based on the n-th 3d point cloud 506n. For example, the device 100 constructs the n-th set of planes 520n by fitting planes to the n-th 3d point cloud 506n according to known algorithms or techniques in the art (e.g., least fitting squares, principal component analysis, simultaneous localization and mapping (SLAM), etc.).

The method 900 continues, at block 906, with the electronic device obtaining a set of time-accumulated planes by merging, expanding, and/or correcting planes fit to the 3d point clouds for reference points X, X-1, X-2, . . . , X-N. As one example, in FIG. 5A, the device 100 or a component thereof (e.g., the correlation module 1162 in FIG. 11) correlates the first set of planes 520a (e.g., associated with the reference point X-2), the second set of planes 520b (e.g., associated with the reference point X-1), . . . , and the n-th set of planes 520n (e.g., associated with the reference point X) to generate a merged set of planes. For example, correlating the sets of planes fit to the 3d point clouds for reference points X, X-1, X-2, . . . , X-N includes enlarging planes, merging planes, and/or correcting the size or orientation of planes across the temporal dimension based on identified similarities and/or differences in the position, size, and/or orientation of the planes fit to the 3d point clouds for reference points X, X-1, X-2, . . . , X-N. In some embodiments, correlating the sets of planes corrects for dynamic planes whose sizes change over time. In some embodiments, correlating the sets of planes enlarges planes as additional associated points are detected over time. In some embodiments, correlating the sets of planes merges planes as it is determined that two or more planes are part of a same plane over time.

The method 900 continues, at block 908, with the electronic device generating the set of quadtrees based on the set of time-accumulated planes. As one example, in FIG. 5A, the device 100 or a component thereof (e.g., the quadtree generation module 1160 in FIG. 11) generate the set of quadtrees 525 based on the merged set of planes from block 906. For example, the device 100 generates the set of quadtrees 525 according to known algorithms or techniques in the art.

FIG. 10 is a flowchart representation of a method 1000 of generating a merged set of quadtrees in accordance with some embodiments. In some embodiments (and as detailed below as an example), the method 1000 is performed by an electronic device (or a portion thereof), such as the electronic device 100 in FIG. 1 or the device 300 in FIG. 3, that includes one or more processors, non-transitory memory, an optional image sensor or camera assembly, an optional display, and one or more optional inputs devices. For example, the electronic device corresponds to a wear computing device, smartphone, tablet, laptop computer, desktop computer, kiosk, set-top box (STB), over-the-top (OTT) box, gaming console, and/or the like.

In some embodiments, the method 1000 is performed by processing logic, including hardware, firmware, software, or a suitable combination thereof. In some embodiments, the method 1000 is performed by one or more processors executing code, programs, or instructions stored in a non-transitory computer-readable storage medium (e.g., a non-transitory memory). Some operations in method 1000 are, optionally, combined and/or the order of some operations is, optionally, changed. Briefly, the method 1000 includes: generating sets of quadtrees for different reference/vantage points; and correlating the sets of quadtrees to obtain a merged set of quadtrees over time.

The method 1000 begins, at block 1002, with the electronic device obtaining a three-dimensional (3d) point cloud based on a set of images for a reference point X (e.g., a time period or camera position). As one example, in FIG. 5B, the device 100 or a component thereof (e.g., the point cloud synthesis module 1156 in FIG. 11) synthesizes an n-th 3d point cloud 506*n* based on the n-th set of images 504*n* relative to an n-th reference/vantage point 502*n* (e.g., the reference point X). For example, the device 100 synthesizes the n-th 3d point cloud 506*n* by identifying points within the n-th set of images 504*n* and locating the points relative to world coordinates by transforming the location of the points in an image space associated with the device coordinates to world coordinates according to known algorithms or techniques in the art.

The method 1000 continues, at block 1004, with the electronic device fitting planes to the 3d point cloud for the reference point X. As one example, in FIG. 5B, the device 100 a component thereof (e.g., the plane fitting module 1158 in FIG. 11) constructs an n-th set of planes 520*n* based on the n-th 3d point cloud 506*n* (e.g., associated with the reference point X). For example, the device 100 constructs the n-th set of planes 520*n* by fitting planes to the n-th 3d point cloud 506*n* according to known algorithms or techniques in the art (e.g., least fitting squares, principal component analysis, simultaneous localization and mapping (SLAM), etc.). As shown in FIG. 6B, for example, in a 3d coordinate space associated with the 3d point cloud, the device 100 constructs (e.g., identifies) a plurality of planes 610*a*, 610*b*, 610*c*, and 610*d* (e.g., infinite planes) based on the clusters of points 605*a*, 605*b*, 605*c*, and 605*d* in FIG. 6A.

The method 1000 continues, at block 1006, with the electronic device triangulating points associated with the 3d point cloud in a two-dimensional (2d) coordinate space associated with the set of images for the reference point X. As shown in FIG. 6C, for example, in a two-dimensional (2d) coordinate space associated with the plurality of images used to synthesize the 3d point cloud, the device 100 triangulates points within the clusters of points 605*a*, 605*b*, 605*c*, and 605*d* in FIG. 6A.

The method 1000 continues, at block 1008, with the electronic device removing triangles in the 2d coordinate space that do not correlate to the planes fit to the 3d point cloud to obtain constrained triangulated regions for the reference point X. As shown in FIG. 6D, for example, in the 2d coordinate space, the device 100 removes triangles having points that are not associated with a same plane based on the plurality of planes 610*a*, 610*b*, 610*c*, and 610*d* in FIG. 6B to obtain a plurality of constrained triangulated regions 620*a*, 620*b*, 620*c*, and 620*d*.

In some embodiments, the electronic device performs the operations corresponding to blocks 1004, 1006, 1008, and 1010 sequentially according to the order shown in FIG. 10. In some embodiments, the electronic device performs the operations corresponding to blocks 1004, 1006, 1008, and 1010 sequentially according to an order different from the order shown in FIG. 10. In some embodiments, the electronic device performs the operations corresponding to blocks 1004, 1006, 1008, and 1010 in parallel.

The method 1000 continues, at block 1010, with the electronic device projecting the constrained triangulated regions onto the 3d coordinate space associated with the 3d point cloud. The method 1000 continues, at block 1012, with the electronic device generating a set of quadtrees based on the constrained triangulated regions for the reference point X. As one example, in FIG. 5B, the device 100 a component thereof (e.g., the plane fitting module 1158 in FIG. 11) generates an n-th set of quadtrees 530*n* (e.g., associated with the reference point X) based on the n-th set of planes 520*n* and/or the n-th 3d point cloud 506*n*. For example, the device 100 generates an n-th set of quadtrees 530*n* according to known algorithms or techniques in the art. As shown in FIG. 6E, for example, the device 100 projects the plurality of constrained triangulated regions 620*a*, 620*b*, 620*c*, and 620*d* back into the 3d coordinate space and quadratizes the plurality of constrained triangulated regions 620*a*, 620*b*, 620*c*, and 620*d* to obtain quadtrees 630*a*, 630*b*, 630*c*, and 630*d*. In FIG. 6E, the quadtrees 630*a*, 630*b*, 630*c*, and 630*d* are enclosed by bounding boxes based on the extent thereof.

The method 1000 continues, at block 1014, with the electronic device merging, expanding, and/or correcting portions of the set of quadtrees for the reference point X based on the sets of quadtrees for reference points X-1, X-2, ..., X-N. As one example, in FIG. 5B, the device 100 or a component thereof (e.g., the correlation module 1162 in FIG. 11) correlates the first set of quadtrees 530*a* (e.g., associated with the reference point X-2), the second set of quadtrees 530*b* (e.g., associated with the reference point X-1), ..., and the n-th set of quadtrees 530*n* (e.g., associated with the reference point X) to generate a merged set of quadtrees 540.

For example, correlating the sets of quadtrees for reference points X, X-1, X-2, ..., X-N includes quadtrees planes, merging quadtrees, and/or correcting the size or orientation of quadtrees across the temporal dimension based on identified similarities and/or differences in the position, size, and/or orientation of the sets of quadtrees for reference points X, X-1, X-2, ..., X-N. In some embodiments, correlating the sets of quadtrees corrects quadtrees associated with dynamic planes whose sizes change over time. In some embodiments, correlating the sets of quadtrees enlarges quadtrees as additional associated points are detected over time. In some embodiments, correlating the sets of quadtrees merges quadtrees as it is determined that two or more quadtrees are part of a same quadtree over time. In some embodiments, each quadtree in the merged set of quadtrees provides an indication of one of: a substantially horizontal plane, a substantially vertical plane, or a plane angled according one or more of three degrees of freedom. In some embodiments, each of the set of merged quadtrees corresponds to a virtual substrate.

Figure 11:
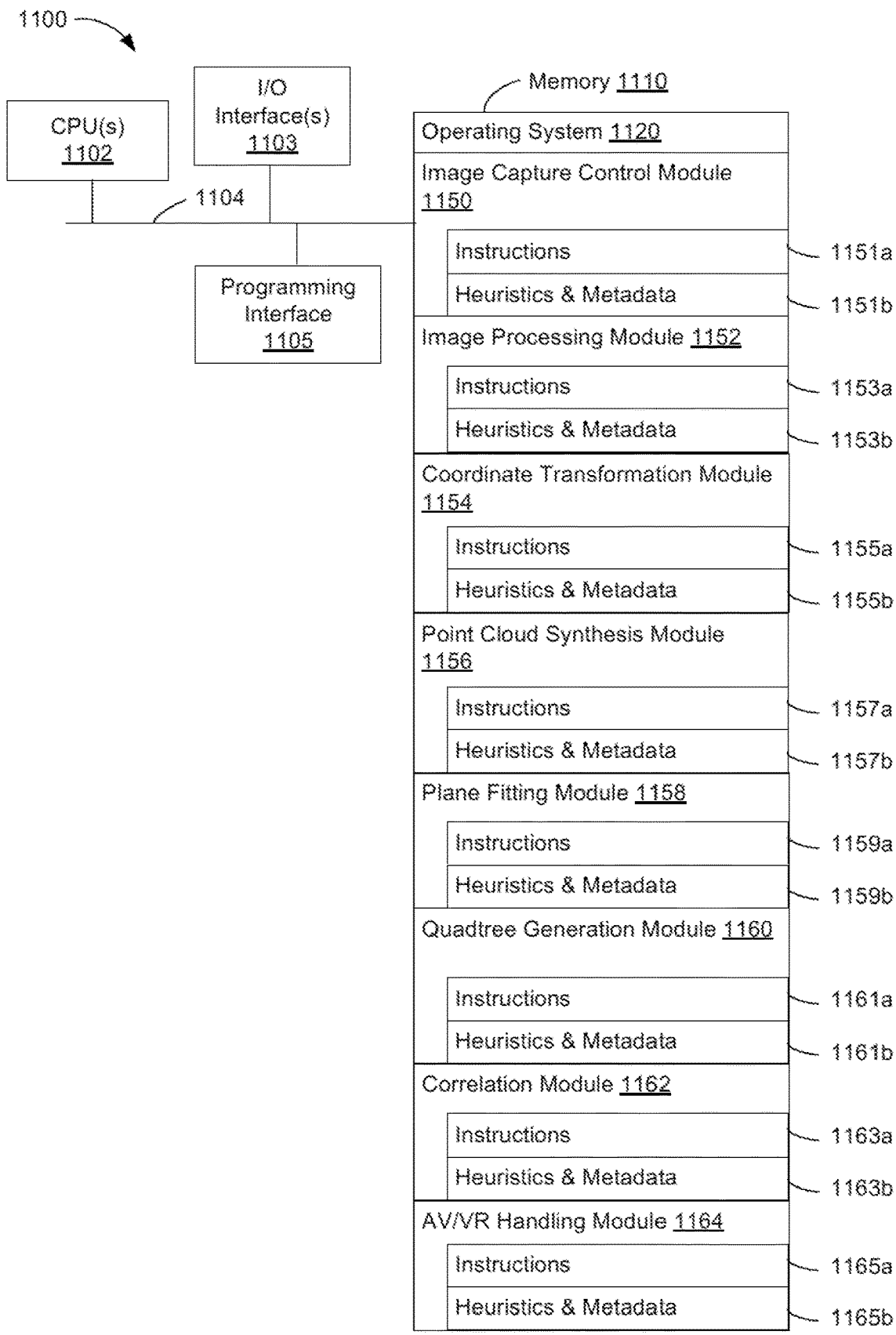
FIG. 11 is a block diagram of a computing device in accordance with some embodiments.

FIG. 11 is a block diagram of a computing device 1100 in accordance with some embodiments. In some embodiments, the computing device 1100 corresponds to the at least a portion of the device 100 in FIG. 1 or the device 300 in FIG. 3 and performs one or more of the functionalities described above. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1100 includes one or more processing units (CPUs) 1102 (e.g., processors), one or more input/output (I/O) interfaces 1103 (e.g., network interfaces, input devices, output devices, and/or sensor interfaces), a memory 1110, a programming interface 1105, and one or more communication buses 1104 for interconnecting these and various other components.

In some embodiments, the communication buses 1104 include circuitry that interconnects and controls communications between system components. The memory 1110 includes high-speed random-access memory, such as DRAM, SRAM, DDR RAM or other random-access solid-state memory devices; and, in some embodiments, include non-volatile memory, such as one or more magnetic disk storage devices, optical disk storage devices, flash memory devices, or other non-volatile solid-state storage devices. The memory 1110 optionally includes one or more storage devices remotely located from the CPU(s) 1102. The memory 1110 comprises a non-transitory computer readable storage medium. Moreover, in some embodiments, the memory 1110 or the non-transitory computer readable storage medium of the memory 1110 stores the following programs, modules and data structures, or a subset thereof including an optional operating system 1120, an image capture control module 1150, an image processing module 1152, a coordinate transformation module 1154, a point cloud synthesis module 1156, a plane fitting module 1158, a quadtree generation module 1160, a correlation module 1162, and an augmented reality and/or virtual reality (AR/VR) handling module 1164. In some embodiments, one or more instructions are included in a combination of logic and non-transitory memory. The operating system 1120 includes procedures for handling various basic system services and for performing hardware dependent tasks.

In some embodiments, the image capture control module 1150 is configured to control the functionality of an image sensor or camera assembly to capture images or obtain image data. To that end, the image capture control module 1150 includes a set of instructions 1151a and heuristics and metadata 1151b.

In some embodiments, the image processing module 1152 is configured to pre-process raw image data from the image sensor or camera assembly (e.g., convert RAW image data to RGB or YCbCr image data). To that end, the image processing module 1152 includes a set of instructions 1153a and heuristics and metadata 1153b.

In some embodiments, the coordinate transformation module 1154 is configured to maintain world coordinates and device coordinates. In some embodiments, the coordinate transformation module 1154 is also configured to transform between coordinate sets. To that end, the coordinate transformation module 1154 includes a set of instructions 1155a and heuristics and metadata 1155b.

In some embodiments, the point cloud synthesis module 1156 is configured to synthesis a three-dimensional (3d) point cloud for a reference/vantage point (e.g., camera position) based on two or more images. To that end, the point cloud synthesis module 1156 includes a set of instructions 1157a and heuristics and metadata 1157b.

In some embodiments, the plane fitting module 1158 is configured to construct (e.g., fit) a set of planes for a respective 3d point cloud (e.g., by way of least fitting squares, principal component analysis, simultaneous localization and mapping (SLAM), etc.). To that end, the plane fitting module 1158 includes a set of instructions 1159a and heuristics and metadata 1159b.

In some embodiments, the quadtree generation module 1160 is configured to generate a set of quadtrees for a respective 3d point cloud. To that end, the quadtree generation module 1160 includes a set of instructions 1161a and heuristics and metadata 1161b.

In some embodiments, the correlation module 1162 is configured to correlate sets of quadtrees for different reference/vantage points across a temporal dimension to obtain a merged set of quadtrees. In some embodiments, the correlation module 1162 is also configured to correlate sets of planes for different reference/vantage points across a temporal dimension to obtain a merged set of planes. To that end, the correlation module 1162 includes a set of instructions 1163a and heuristics and metadata 1163b.

In some embodiments, the AR/VR handling module 1164 is configured to display visual indications of detected planes and/or quadtrees. In some embodiments, the AR/VR handling module 1164 is configured to display and modify AR/VR objects. To that end, the AR/VR handling module 1164 includes a set of instructions 1165a and heuristics and metadata 1165b.

Although the image capture control module 1150, the image processing module 1152, the coordinate transformation module 1154, the point cloud synthesis module 1156, the plane fitting module 1158, the quadtree generation module 1160, the correlation module 1162, and the AR/VR handling module 1164 are illustrated as residing on a single computing device 1100, it should be understood that in other embodiments, any combination of the image capture control module 1150, the image processing module 1152, the coordinate transformation module 1154, the point cloud synthesis module 1156, the plane fitting module 1158, the quadtree generation module 1160, the correlation module 1162, and the AR/VR handling module 1164 can reside in separate computing devices in various embodiments. For example, in some embodiments each of the image capture control module 1150, the image processing module 1152, the coordinate transformation module 1154, the point cloud synthesis module 1156, the plane fitting module 1158, the quadtree generation module 1160, the correlation module 1162, and the AR/VR handling module 1164 reside on a separate computing device or in the cloud.

Moreover, FIG. 11 is intended more as a functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs or GP-GPUs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

The disclosure is not intended to be limited to the embodiments shown herein. Various modifications to the embodiments described in this disclosure may be readily apparent to those skilled in the art, and the generic principles defined herein may be applied to other embodiments without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    at an electronic device with one or more processors and non-transitory memory:
        obtaining a plurality of sets of images associated with different capture times;
        synthesizing a three-dimensional point cloud for each of the plurality of sets of images;
        generating a plurality of sets of quadtrees based on the respective three-dimensional point clouds; and
        generating a merged set of quadtrees based on the plurality of sets of quadtrees, wherein the merged set of quadtrees characterize a merged set of planes across the three-dimensional point clouds.

2. The method of claim 1, further comprising:
    constructing a set of one or more planes for each of the three-dimensional point clouds, wherein the plurality of sets of quadtrees are generated from the sets of one or more planes, and wherein the merged set of planes corresponds to a correlation between the sets of one or more planes across a temporal dimension.

3. The method of claim 2, wherein the correlation between the sets of one or more planes across the temporal dimension includes at least one of: enlarging planes, merging planes, or correcting planes.

4. The method of claim 1,
    wherein generating the merged set of quadtrees includes generating the merged set of merged quadtrees by correlating the plurality of sets of quadtrees across a temporal dimension.

5. The method of claim 4, wherein correlating the plurality of sets of quadtrees includes at least one of: enlarging portions of quadtrees, merging quadtrees, or correcting portions of quadtrees.

6. The method of claim 2, wherein constructing the sets of one or more planes includes fitting planes to clusters of points in the three-dimension point clouds to obtain the merged set of planes; and
    wherein generating the merged set of quadtrees includes:
        triangulating points across the three-dimensional point clouds;
        removing triangles having points that are not in the merged set of planes to obtain constrained triangulated regions;
        projecting the constrained triangulated regions onto the merged set of planes; and
        quadratizing the constrained triangulated regions to obtain the merged set of quadtrees.

7. The method of claim 1, further comprising:
    displaying, on a display of the electronic device, a media capture preview of objects in a field of view of an image sensor of the electronic device, wherein the media capture preview changes as the objects in the field of view of the image sensor change; and
    in response to generating the merged set of quadtrees, displaying, on the display, planes associated with the set of merged quadtrees overlaid on the media capture preview, wherein a perimeter of the planes correspond to bounds of the set of merged quadtrees.

8. The method of claim 7, further comprising:
    while displaying the planes overlaid on the media capture preview, detecting, via one or more inputs devices of the electronic device, a user input that corresponds to selecting an augmented or virtual reality object from an object selection interface; and in response to detecting the user input, displaying, on the display, the selected augmented or virtual reality object overlaid on the media capture preview relative to one of the planes.

9. The method of claim 1, wherein a first set of images in plurality of sets of images corresponds to a first reference point, and wherein a second set of images in plurality of sets of images corresponds to a second reference point.

10. The method of claim 1, wherein each quadtree in the merged set of quadtrees provides an indication of one of: a substantially horizontal plane, a substantially vertical plane, or a plane angled according one or more of three degrees of freedom.

11. An electronic device, comprising:
one or more processors;
non-transitory memory; and
one or more programs, wherein the one or more programs are stored in the non-transitory memory and configured to be executed by the one or more processors, the one or more programs including instructions for:
obtaining a plurality of sets of images associated with different capture times;
synthesizing a three-dimensional point cloud for each of the plurality of sets of images;
generating a plurality of sets of quadtrees based on the respective three-dimensional point clouds; and
generating a merged set of quadtrees based on the plurality of sets of quadtrees, wherein the merged set of quadtrees characterize a merged set of planes across the three-dimensional point clouds.

12. The electronic device of claim 11, wherein the one or more programs further include instructions for:
constructing a set of one or more planes for each of the three-dimensional point clouds, wherein the plurality of sets of quadtrees are generated from the sets of one or more planes, and wherein the merged set of planes corresponds to a correlation between the sets of one or more planes across a temporal dimension.

13. The electronic device of claim 12, wherein the correlation between the sets of one or more planes across the temporal dimension includes at least one of: enlarging planes, merging planes, or correcting planes.

14. The electronic device of claim 11,
wherein generating the merged set of quadtrees includes generating the merged set of merged quadtrees by correlating the plurality of sets of quadtrees across a temporal dimension.

15. The electronic device of claim 14, wherein correlating the plurality of sets of quadtrees includes at least one of: enlarging portions of quadtrees, merging quadtrees, or correcting portions of quadtrees.

16. The electronic device of claim 12, wherein constructing the sets of one or more planes includes fitting planes to clusters of points in the three-dimension point clouds to obtain the merged set of planes; and
wherein generating the merged set of quadtrees includes:
triangulating points across the three-dimensional point clouds;
removing triangles having points that are not in the merged set of planes to obtain constrained triangulated regions;
projecting the constrained triangulated regions onto the merged set of planes; and
quadratizing the constrained triangulated regions to obtain the merged set of quadtrees.

17. A non-transitory computer readable storage medium storing one or more programs, the one or more programs comprising instructions, which, when executed by an electronic device, cause the electronic device to:
obtain a plurality of sets of images associated with different capture times;
synthesize a three-dimensional point cloud for each of the plurality of sets of images;
generate a plurality of sets of quadtrees based on the respective three-dimensional point clouds; and
generate a merged set of quadtrees based on the plurality of sets of quadtrees, wherein the merged set of quadtrees characterize a merged set of planes across the three-dimensional point clouds.

18. The non-transitory computer readable storage medium of claim 17, wherein the instructions further cause the electronic device to:
construct a set of one or more planes includes constructing a plurality of sets of planes for each of the three-dimensional point clouds, wherein the plurality of sets of quadtrees are generated from the sets of one or more planes, and wherein the merged set of planes corresponds to a correlation between the sets of one or more planes across a temporal dimension.

19. The non-transitory computer readable storage medium of claim 18, wherein the correlation between the sets of one or more planes across the temporal dimension includes at least one of: enlarging planes, merging planes, or correcting planes.

20. The non-transitory computer readable storage medium of claim 17,
wherein generating the merged set of quadtrees includes generating the merged set of merged quadtrees by correlating the plurality of sets of quadtrees across a temporal dimension.

21. The non-transitory computer readable storage medium of claim 20, wherein correlating the plurality of sets of quadtrees includes at least one of: enlarging portions of quadtrees, merging quadtrees, or correcting portions of quadtrees.

22. The non-transitory computer readable storage medium of claim 18, wherein constructing the sets of one or more planes includes fitting planes to clusters of points in the three-dimension point clouds to obtain the merged set of planes; and
wherein generating the merged set of quadtrees includes:
triangulating points across the three-dimensional point clouds;
removing triangles having points that are not in the merged set of planes to obtain constrained triangulated regions;
projecting the constrained triangulated regions onto the merged set of planes; and
quadratizing the constrained triangulated regions to obtain the merged set of quadtrees.

* * * * *